(12) United States Patent
Niederstadt et al.

(10) Patent No.: US 9,217,490 B2
(45) Date of Patent: Dec. 22, 2015

(54) DEVICES AND METHODS FOR REMANUFACTURING PRINTER CARTRIDGES

(71) Applicants: William F. Niederstadt, Chesapeake, VA (US); Shinichi Iijima, Los Angeles, CA (US); Kozo Ishio, Virginia Beach, VA (US); Edgar Covarrubias, Tijuana (MX)

(72) Inventors: William F. Niederstadt, Chesapeake, VA (US); Shinichi Iijima, Los Angeles, CA (US); Kozo Ishio, Virginia Beach, VA (US); Edgar Covarrubias, Tijuana (MX)

(73) Assignee: Mitsubishi Kagaku Imaging Corporation, Glendale, CA (US)

( * ) Notice: Subject to any disclaimer, the term of this patent is extended or adjusted under 35 U.S.C. 154(b) by 0 days.

(21) Appl. No.: 14/465,350

(22) Filed: Aug. 21, 2014

(65) Prior Publication Data
US 2015/0053033 A1    Feb. 26, 2015

Related U.S. Application Data

(60) Provisional application No. 61/959,377, filed on Aug. 21, 2013.

(51) Int. Cl.
*G03G 15/00*    (2006.01)
*F16H 1/10*    (2006.01)

(52) U.S. Cl.
CPC ........ *F16H 1/10* (2013.01); *G03G 2215/00987* (2013.01)

(58) Field of Classification Search
CPC .......................................... G03G 2215/00987
USPC ........................................................ 399/109
See application file for complete search history.

*Primary Examiner* — Walter L Lindsay, Jr.
*Assistant Examiner* — Ruth Labombard

(57) ABSTRACT

Devices and methods for remanufacturing a printer cartridge component are provided. The printer cartridge component is a drum gear assembly configured for attachment to an organic photoconductor (OPC) drum configured for use in a printer cartridge. The drum gear assembly has a drum drive gear and a drive axle attached to the drum drive gear. The drive axle has a first end with teeth portions. The device has a first portion having a drive axle engagement end configured to engage the drive axle. The device further has a second portion coupled to the first portion. The second portion has a teeth engagement portion to engage one or more of the teeth portions of the drive axle. The first portion and the second portion are configured for assembling and disassembling the drum gear assembly.

26 Claims, 30 Drawing Sheets

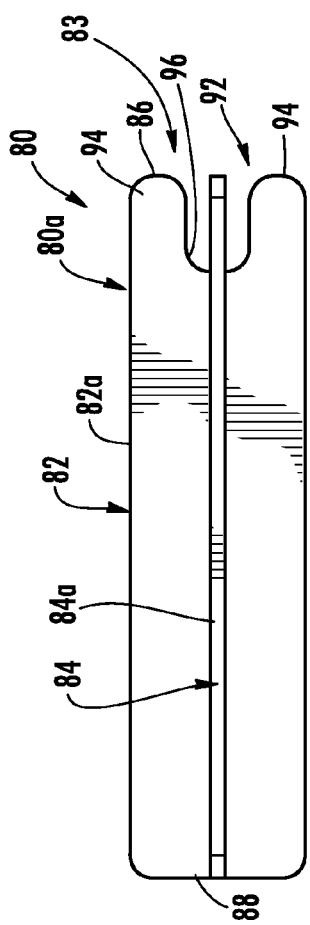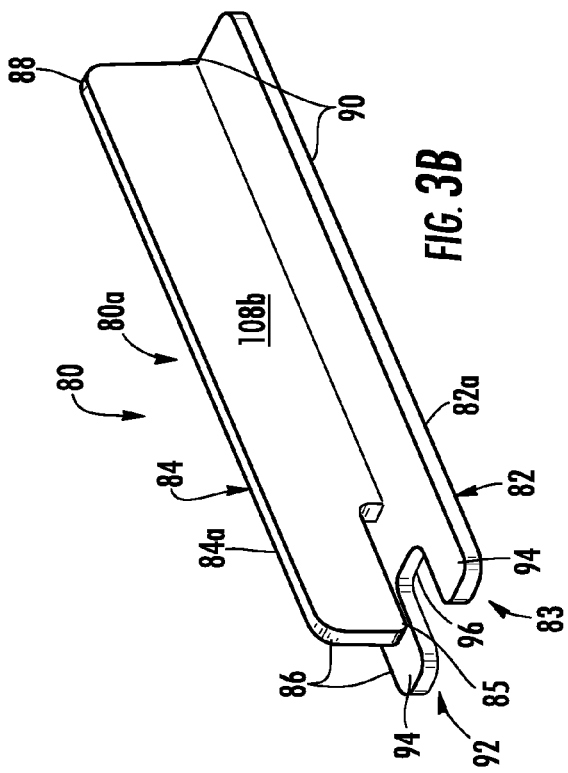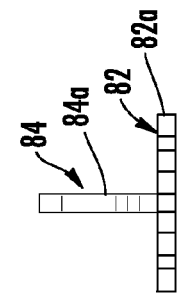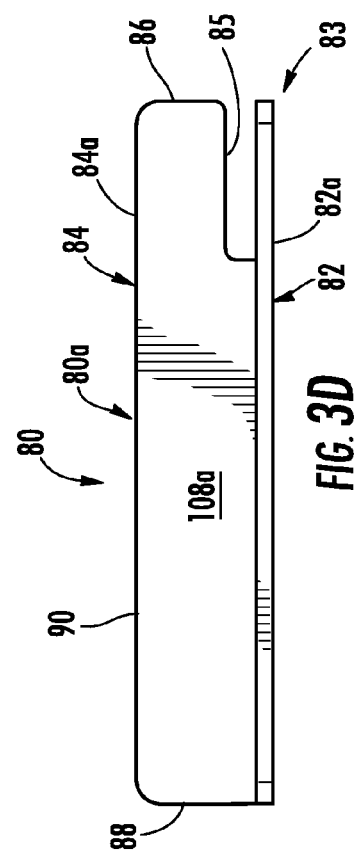

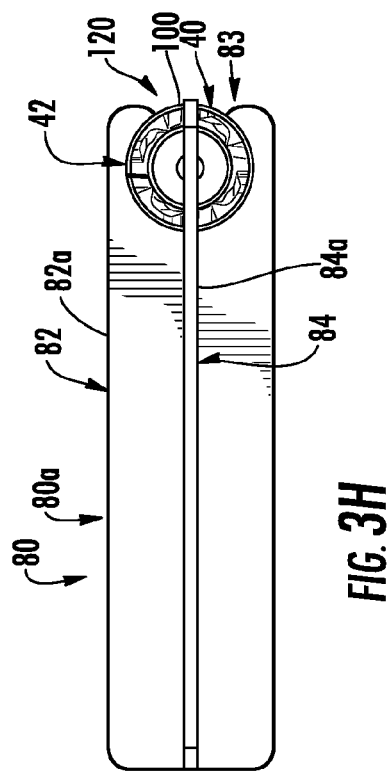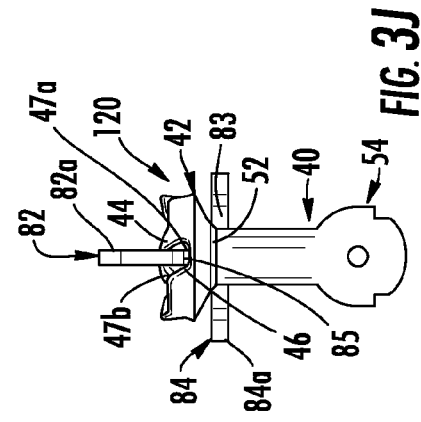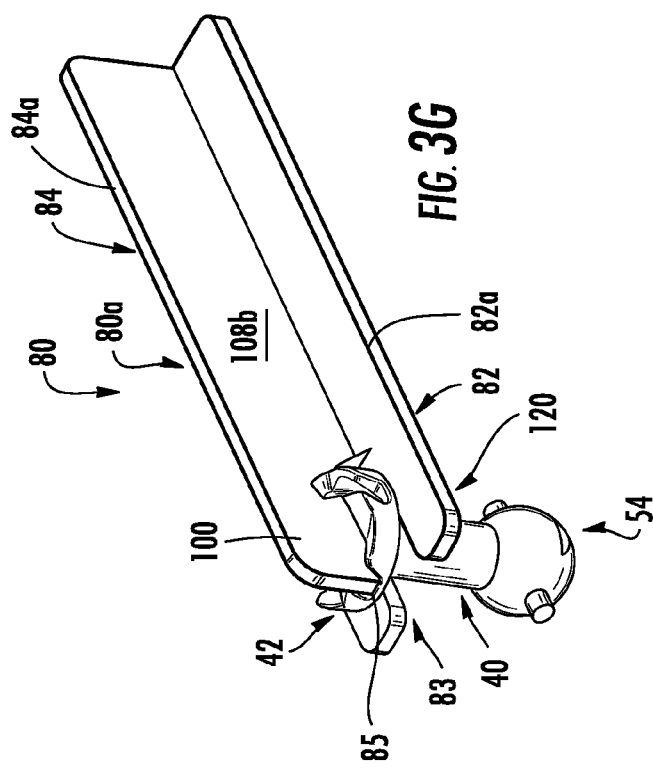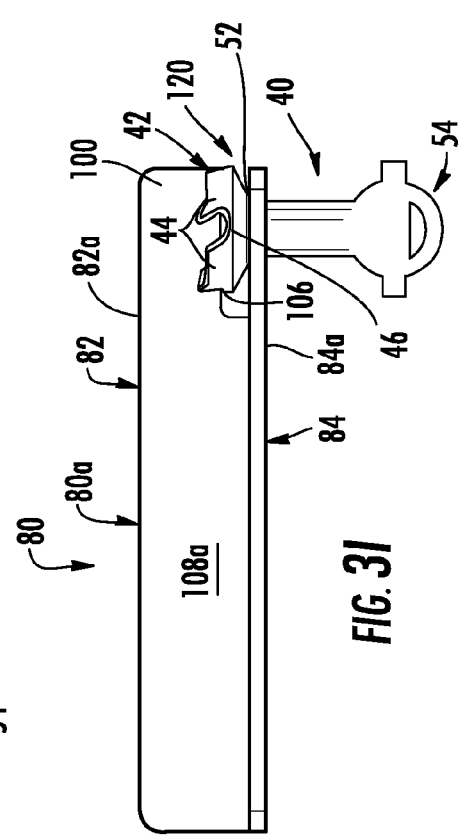
FIG. 3H
FIG. 3J
FIG. 3G
FIG. 3I

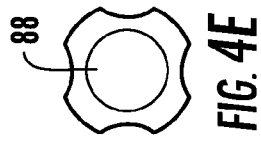
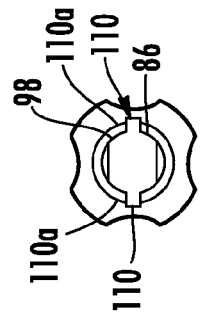
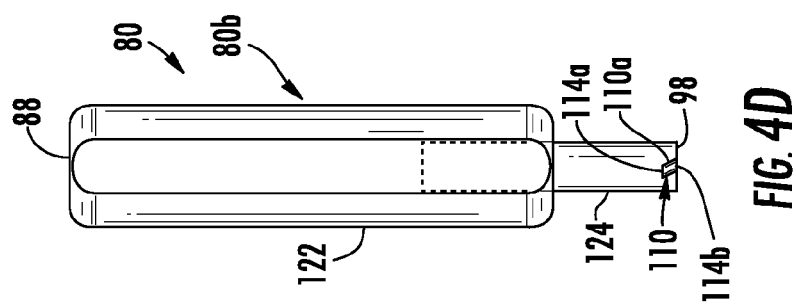
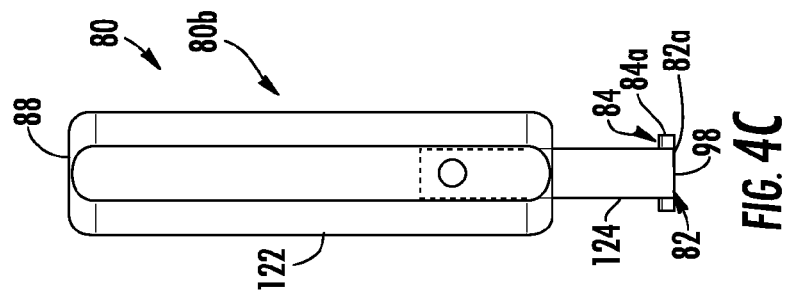
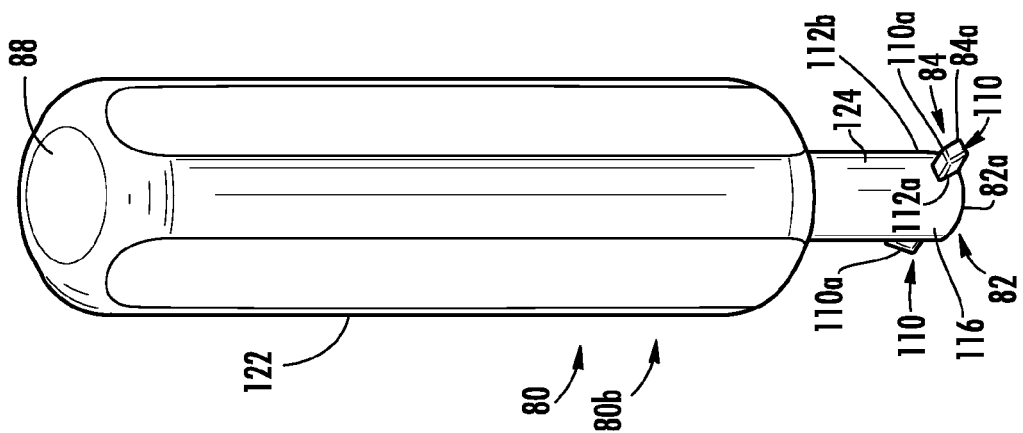

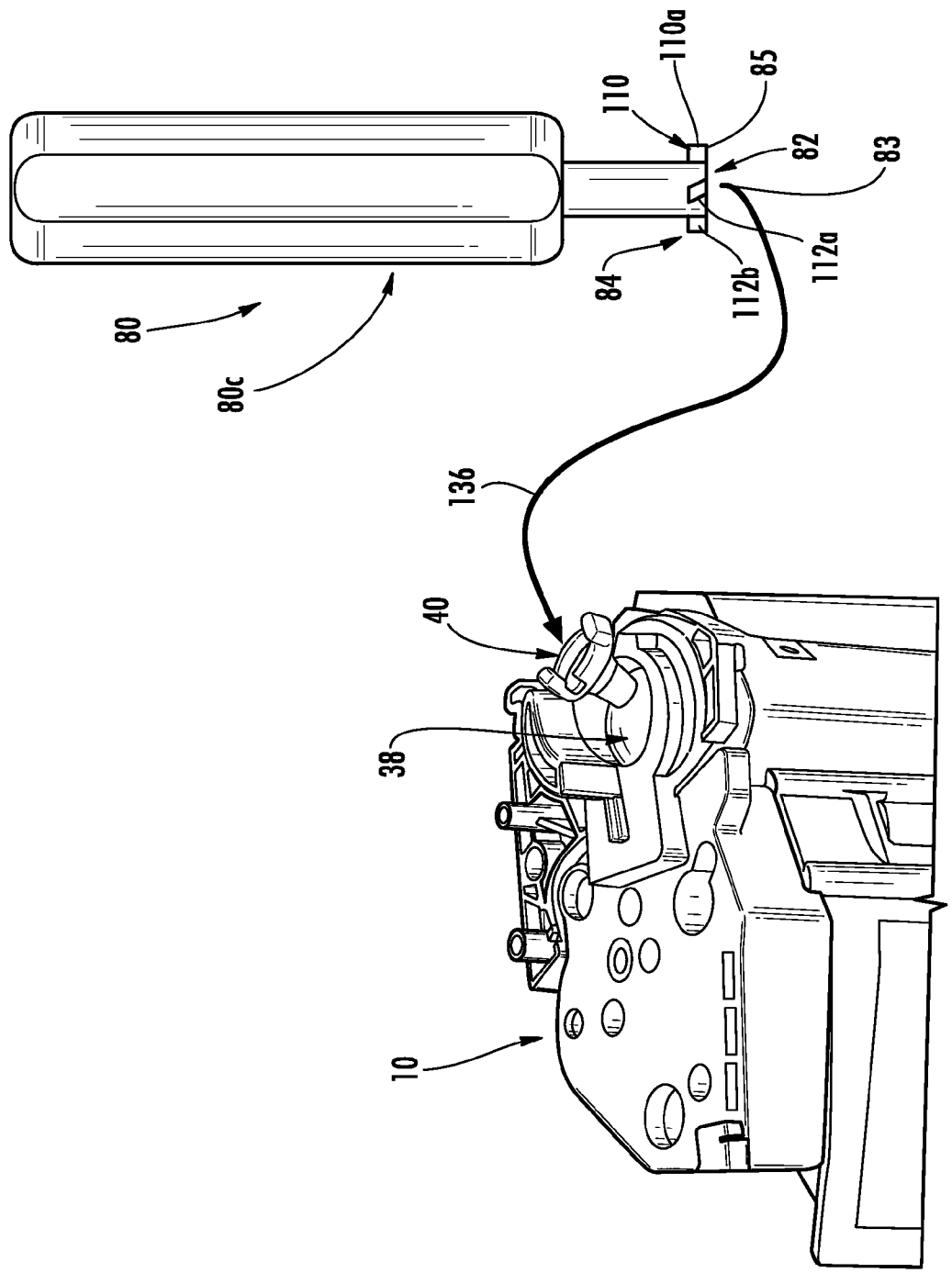

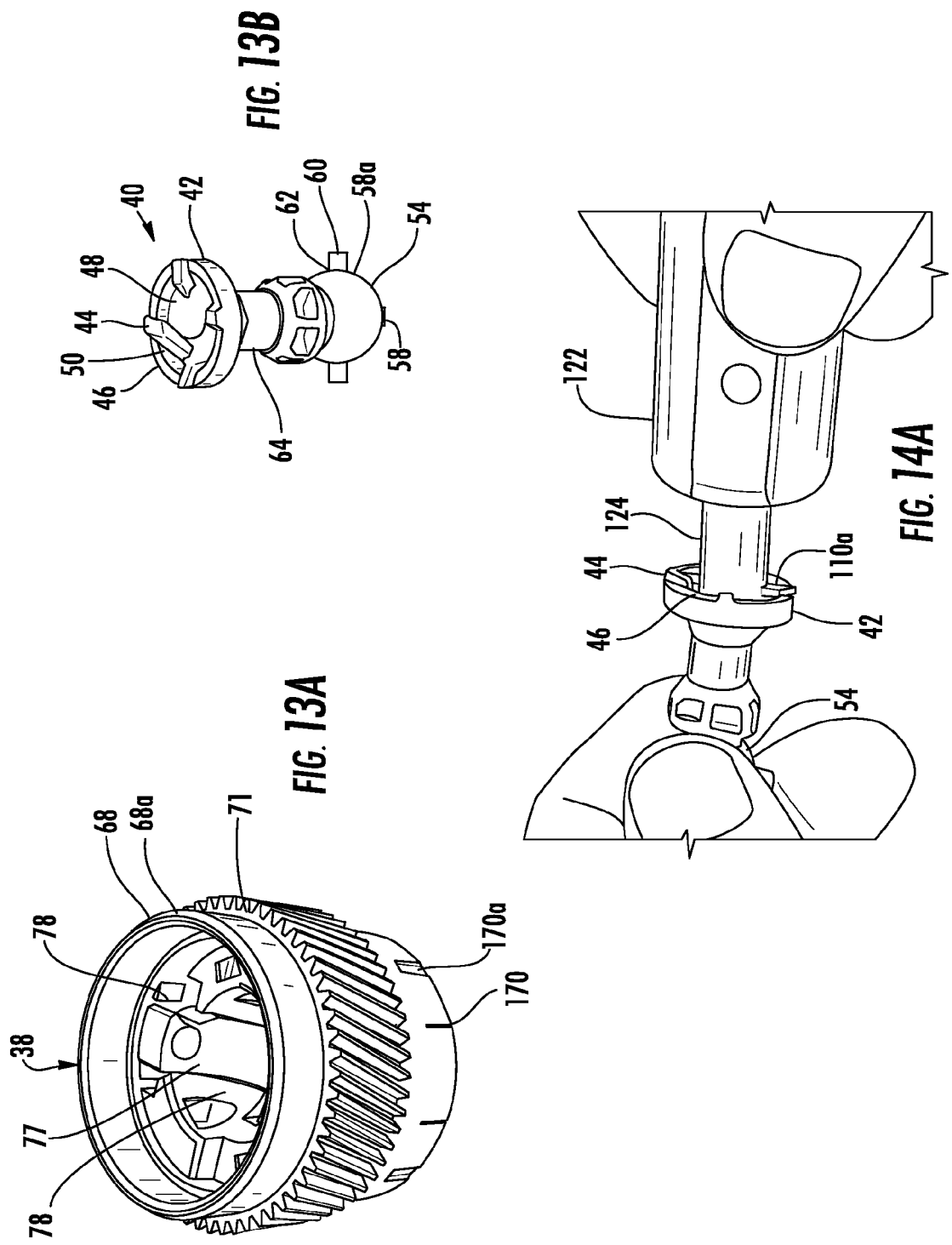

DEVICES AND METHODS FOR REMANUFACTURING PRINTER CARTRIDGES

BACKGROUND a. Field of the Invention

The invention relates to devices and methods for remanufacturing printer cartridge components, and, in particular, to devices and methods for remanufacturing laser printer cartridge components by remanufacturing used organic photoconductor (OPC) flange portions of assembled OPC drum flanges and attaching or assembling such used OPC flange portions to replacement OPC drum cylinder portions.

b. Background Art

Printer cartridges, such as toner cartridges, are used in various electrophotographic imaging devices, such as laser printers, copiers, facsimile machines, and multifunction imaging devices. Once original equipment manufacturer (OEM) printer cartridges are used, they are often recycled and remanufactured. The process of remanufacturing a printer cartridge may include cleaning the cartridge, repairing damaged parts, replacing worn parts, reassembling with new parts, and replenishing the cartridge with toner. The process of remanufacturing a printer cartridge requires that the printer cartridge be disassembled so that access to the various parts can be achieved, and further requires that the printer cartridge be reassembled for subsequent use.

Printer cartridges typically include organic photoconductive drums that may be designed to be electrically charged to be able to attract toner. An assembled OPC drum typically comprises a cylinder portion and a drum gear assembly. For example, the drum gear assembly may comprise a drum drive gear attached to an end of the cylinder portion of the OPC drum, and may comprise a drive axle attached to the drum drive gear. The drive axle is configured for attachment to the printer to drive the rotation of the OPC drum during use. The drum drive gear may be inserted into one end of the cylinder portion and may be attached to that end of the cylinder portion with an adhesive or glue and/or a known attachment or assembly process. The OPC drum cylinder portion and/or drum drive gear may wear out from use at a faster rate than the drive axle and one or both may need to be replaced during remanufacturing, while the drive axle may be reused if it is not damaged. However, the drive axle may be attached to the drum drive gear in a manner that makes the drive axle difficult to remove from the drum drive gear, and when removal of the drive axle from the drum drive gear is attempted, such removal may cause damage to the drive axle, so that the drive axle could not be reused. For example, such known assembled OPC drums with attached drum gear assemblies for laser printer applications may include a lock on the drive axle or drum drive gear that helps to hold the drive axle in place and/or that locks the drum drive gear to the OPC drum cylinder portion.

During remanufacturing of such known drive axles attached to known drum drive gears of OPC drums, known hand tools, such as screwdrivers, pliers, spring hooks, and scraping tools, may be typically used to pry off and separate the drive axle from the drum drive gear and/or may be used to push out and remove the drive axle from the drum drive gear in order to remove the drive axle from the drum drive gear attached to the OPC drum cylinder portion. However, if not used carefully and properly, such known hand tools may damage the drive axle. In particular, damage to the drive axle, such as damage to the portions of the drive axle that contact the printer, may affect or prevent reuse and remanufacturing of the used drive axle with a replacement drum drive gear and/or OPC drum cylinder portion.

It is thus desirable to be able to remove and replace the used drive axle on a used drum drive gear attached to a used OPC drum without damaging the used drive axle. This helps preserve the appearance of the used drive axle and the ability to reuse and reassemble the used drive axle, and minimizes remanufacturing steps. Devices and methods for efficiently and quickly removing a used drive axle from a used drum drive gear and attached OPC drum cylinder portion, and reusing the used drive axle with a replacement or new drum drive gear and/or replacement or new OPC drum cylinder portion are desired.

Accordingly, there is a need for an improved device and method for remanufacturing printer cartridge components, including reusing used drive axles of disassembled drum gear assemblies and attaching or assembling such used drive axles to replacement drum drive gears and/or OPC drum cylinder portions, that overcomes the issues associated with known devices and methods.

SUMMARY

The disclosed inventions satisfy this need for an improved method and device for remanufacturing printer cartridge components, including reusing used OPC flange portions of assembled OPC drums and attaching or assembling such used OPC flange portions to replacement OPC drum cylinder portions.

One embodiment of the invention comprises a device for remanufacturing a printer cartridge component, the printer cartridge component being a drum gear assembly configured for attachment to an OPC drum configured for use in a printer cartridge. The drum gear assembly has a drum drive gear and a drive axle attached to the drum drive gear. The drive axle has a first end with teeth portions. The device for remanufacturing comprises a first portion having a drive axle engagement end configured to engage the drive axle. The device further comprises a second portion coupled to the first portion. The second portion has a teeth engagement portion to engage one or more of the teeth portions of the drive axle. The first portion and the second portion are configured for assembling and disassembling the drum gear assembly.

In another embodiment, the invention comprises a method for remanufacturing a printer cartridge component, the printer cartridge component being a drum gear assembly configured for attachment to an OPC drum configured for use in a printer cartridge. The drum gear assembly has a drum drive gear and a drive axle attached to the drum drive gear, the drive axle having a first end with teeth portions. The method comprises the step of providing a device for disassembling the drum gear assembly. The device comprises a first portion having a drive axle engagement end. The device further comprises a second portion coupled to the first portion. The second portion has a teeth engagement portion. The method further comprises the step of engaging the drive axle engagement end to the first end of the drive axle. The method further comprises the step of engaging the teeth engagement portion to one or more of the teeth portions formed in the first end of the drive axle. The method further comprises the step of rotating the device to release one or more pin elements at a second end of the drive axle from a snap fit attachment with the drum drive gear. The method further comprises the step of removing the drive axle from the drum drive gear to disassemble the drum gear assembly. The method further comprises the step of disengaging the device from the removed drive axle.

In another embodiment, the invention comprises a method for remanufacturing a printer cartridge component, the printer cartridge component being a drum gear assembly configured for attachment to an OPC drum configured for use in a printer cartridge. The drum gear assembly has a drum drive gear and a drive axle attached to the drum drive gear, the drive axle having a first end with teeth portions. The method comprises the step of providing a device for disassembling the drum gear assembly. The device comprises a first portion having a drive axle engagement end. The device further comprises a second portion coupled to the first portion. The second portion has a teeth engagement portion. The method further comprises the step of engaging the drive axle engagement end to the first end of the drive axle. The method further comprises the step of engaging the teeth engagement portion to one or more of the teeth portions formed in the first end of the drive axle. The method further comprises the step of rotating the device to release one or more pin elements at a second end of the drive axle from a snap fit attachment with the drum drive gear. The method further comprises the step of removing the drive axle from the drum drive gear to disassemble the drum gear assembly. The method further comprises the step of disengaging the device from the removed drive axle.

In another embodiment, the invention comprises a method for disassembling a drum gear assembly attached to an OPC drum configured for installation in a printer cartridge. The drum gear assembly has a drum drive gear and a drive axle attached to the drum drive gear. The drive axle has a first end with teeth portions. The method comprises the step of providing a device for disassembling the drum gear assembly. The device comprises a first portion having a drive axle engagement end. The device comprises a second portion coupled to the first portion. The second portion has a teeth engagement portion. The method further comprises the step of engaging the drive axle engagement end to the first end of the drive axle. The method further comprises the step of engaging the teeth engagement portion to one or more of the teeth portions formed in the first end of the drive axle. The method further comprises the step of rotating the device to unsnap each of the one or more pin elements at the second end of the drive axle from one or more corresponding groove portions in the drum drive gear to disassemble the drum gear assembly. The method further comprises the step of disengaging the device from the drive axle of the assembled drum gear assembly. The method further comprises the step of detaching the drive axle from the from the drum drive gear.

The above description sets forth, rather broadly, a summary of the disclosed embodiments so that the detailed description that follows may be better understood and contributions of the invention may be better appreciated by a person of skill in the art. Some of the disclosed embodiments may not include all of the features or characteristics listed in the above summary. There may be, of course, other features of the disclosed embodiments that will be appreciated by a person of skill in the art based on the description and may form the subject matter of claims. The features, functions, and advantages that have been discussed can be achieved independently in various embodiments of the disclosure or may be combined in yet other embodiments, further details of which can be seen with reference to the following description and drawings.

DESCRIPTION OF DRAWINGS

The invention can be better understood with reference to the following detailed description taken in conjunction with the accompanying drawings which illustrate preferred and exemplary embodiments, but which are not necessarily drawn to scale, wherein:

FIG. 3B is a right side perspective view of the device of FIG. 3A;

FIG. 3C is a top view of the device of FIG. 3A;

FIG. 3D is a left side view of the device of FIG. 3A;

FIG. 3E is a front view of the device of FIG. 3A;

FIG. 3G is a right side perspective view of the device with attached drive axle of FIG. 3F;

FIG. 3H is a top view of the device with attached drive axle of FIG. 3F;

FIG. 3I is a left view of the device with attached drive axle of FIG. 3F;

FIG. 3J is a front view of the device with attached drive axle of FIG. 3F;

FIG. 4B is a right side perspective view of the device of FIG. 4A;

FIG. 4C is a front view of the device of FIG. 4A;

FIG. 4D is a right side view of the device of FIG. 4A;

FIG. 4E is a top view of the device of FIG. 4A;

FIG. 4F is a bottom view of the device of FIG. 4A;

FIG. 7A shows an embodiment of a device and method used in disassembling a drum gear assembly in one of the embodiments of a method of the disclosure;

FIG. 13A shows a top perspective view of an embodiment of a drive gear of a drum gear assembly of which an embodiment of a device and a method of the disclosure may be applied;

FIG. 13B shows a top perspective view of an embodiment of a drive axle of a drum gear assembly of which an embodiment of a device and a method of the disclosure may be applied;

FIGS. 14A-14E show views of an embodiment of a device used in disassembling a drum gear assembly in one of the embodiments of a method of the disclosure.

DETAILED DESCRIPTION

Disclosed embodiments will now be described more fully hereinafter with reference to the accompanying drawings, in which some, but not all disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art. It is to be understood that other embodiments may be utilized and structural changes may be made without departing from the scope of the invention. Also, it is to be understood that the phraseology and terminology employed herein are for the purpose of description and should not be regarded as limiting.

The order in which the steps are presented below is not limited to any particular order and does not necessarily imply that they have to be performed in the order presented. It will be understood by those of ordinary skill in the art that the order of these steps can be rearranged and performed in any suitable manner. It will further be understood by those of ordinary skill in the art that some steps may be omitted or added and still fall within the spirit of the invention.

The disclosed embodiments provide various devices and methods for remanufacturing printer cartridge components of laser printers, such as laser cartridges, including toner cartridges, such printer cartridge components being drum gear assemblies configured for coupling to OPC drums configured for use in printer cartridges. The disclosed embodiments of the devices and methods may be used with printer cartridge components that can be used in laser printer models, such as Hewlett Packard Corporation HP-P2055 and HP-P3015 families of laser printers, or other HP laser printer models, and may also be used with other suitable printer cartridges.

Figure 1A:
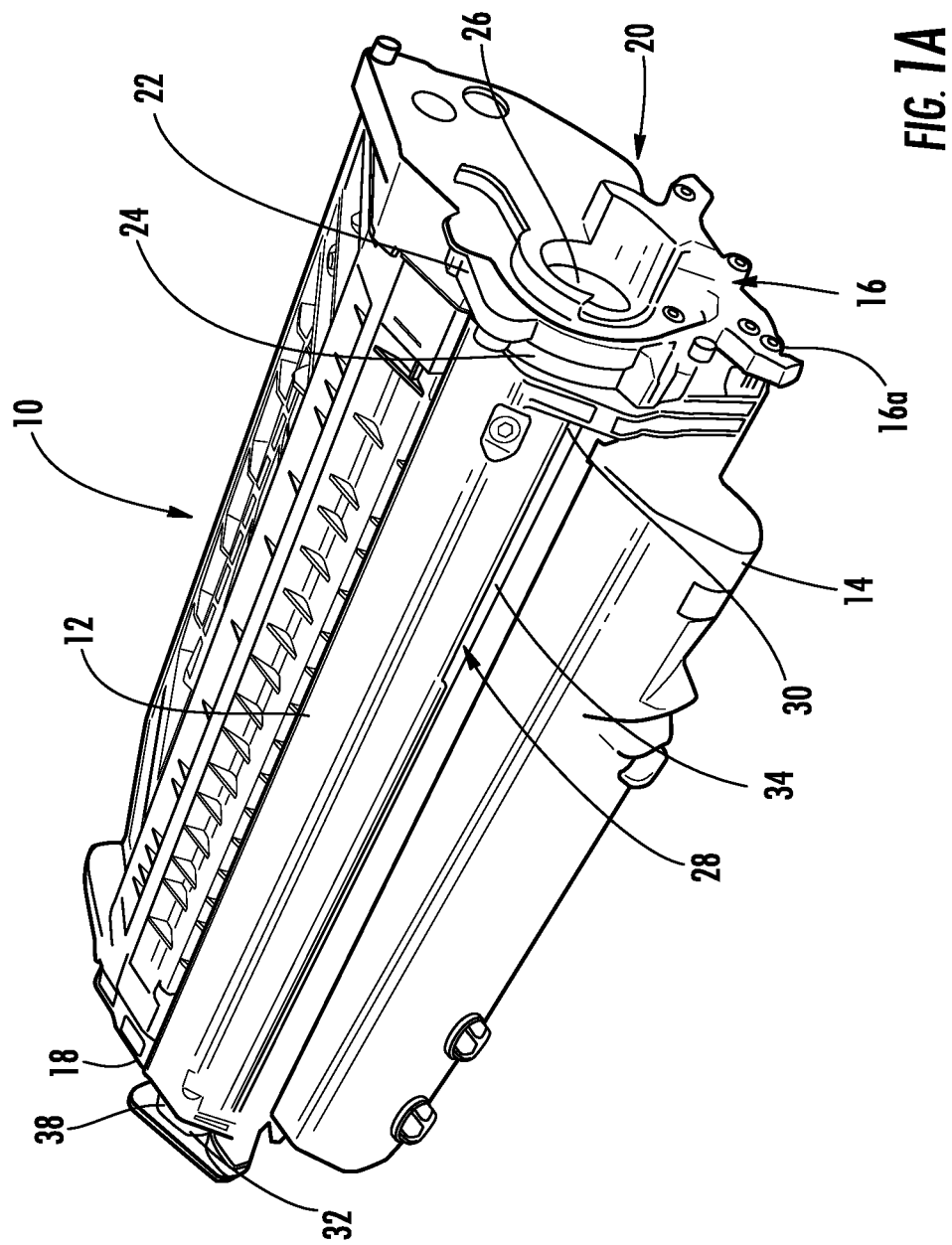
FIG. 1A shows a front perspective view of a printer cartridge of which embodiments of a device and a method of the disclosure may be applied.

Referring to the Figures, FIG. 1A shows a front perspective view of a printer cartridge 10 of which embodiments of a device 80 (see FIGS. 3A, 4A, 5A, 12A) and a method 200 (see FIG. 10) and a method 250 (see FIG. 11) of the disclosure may be applied. As shown in FIG. 1A, the printer cartridge 10 comprises a top portion 12, a bottom portion 14, a first end 16, and a second end 18. The first end 16 comprises a gear end 16a having a gear plate 20. The gear plate 20 comprises a gear plate cover portion 22, a gear plate cartridge attachment portion 24, and an opening 26 for housing a drum gear assembly 36a (see FIG. 1B).

The printer cartridge 10 of FIG. 1A also houses an OPC drum 28 having a first end 30, a second end 32, and a cylindrical body 34. The first end 30 of the OPC drum is attached to a drum drive gear 38 (see FIGS. 1B, 1C) of the drum gear assembly 36a (see FIG. 1B).

Figure 1B:
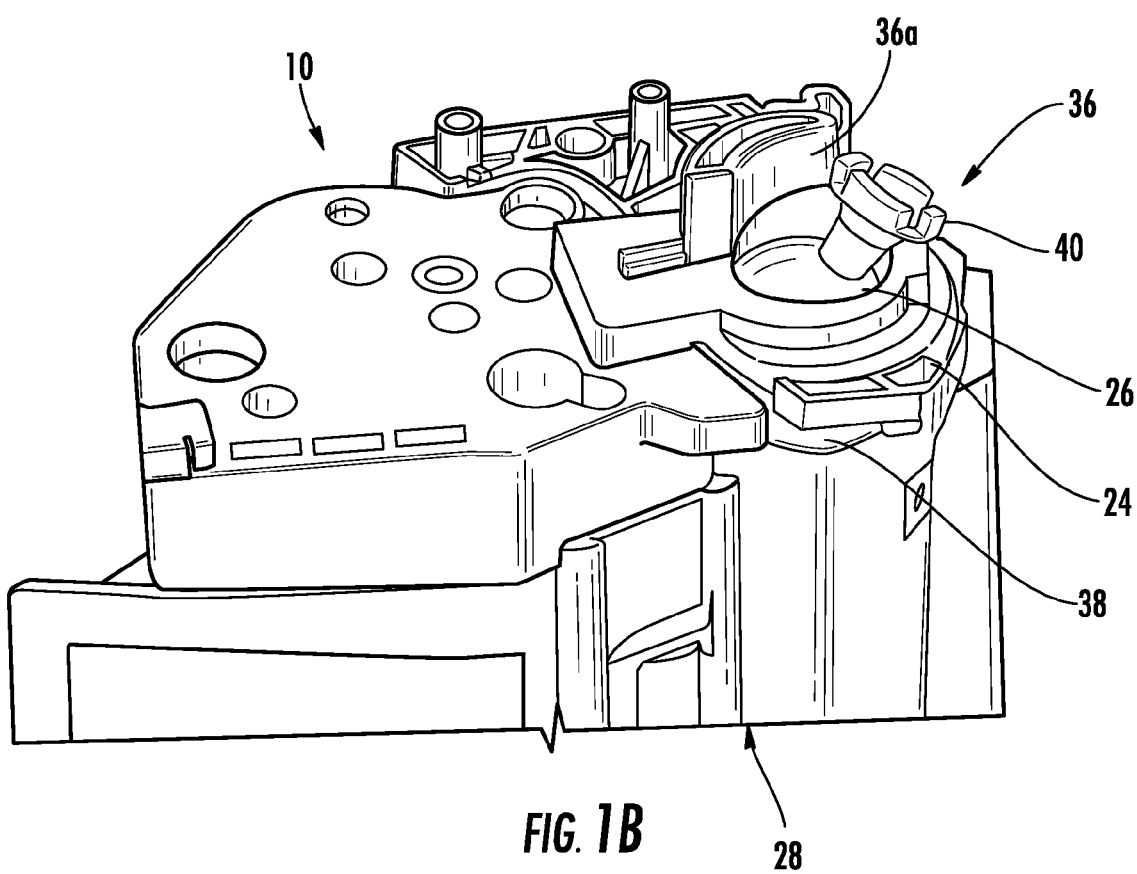
FIG. 1B shows a close-up, side perspective view of the printer cartridge of FIG. 1A having a printer cartridge component of which embodiments of a device and a method of the disclosure may be applied.
Figure 1C:
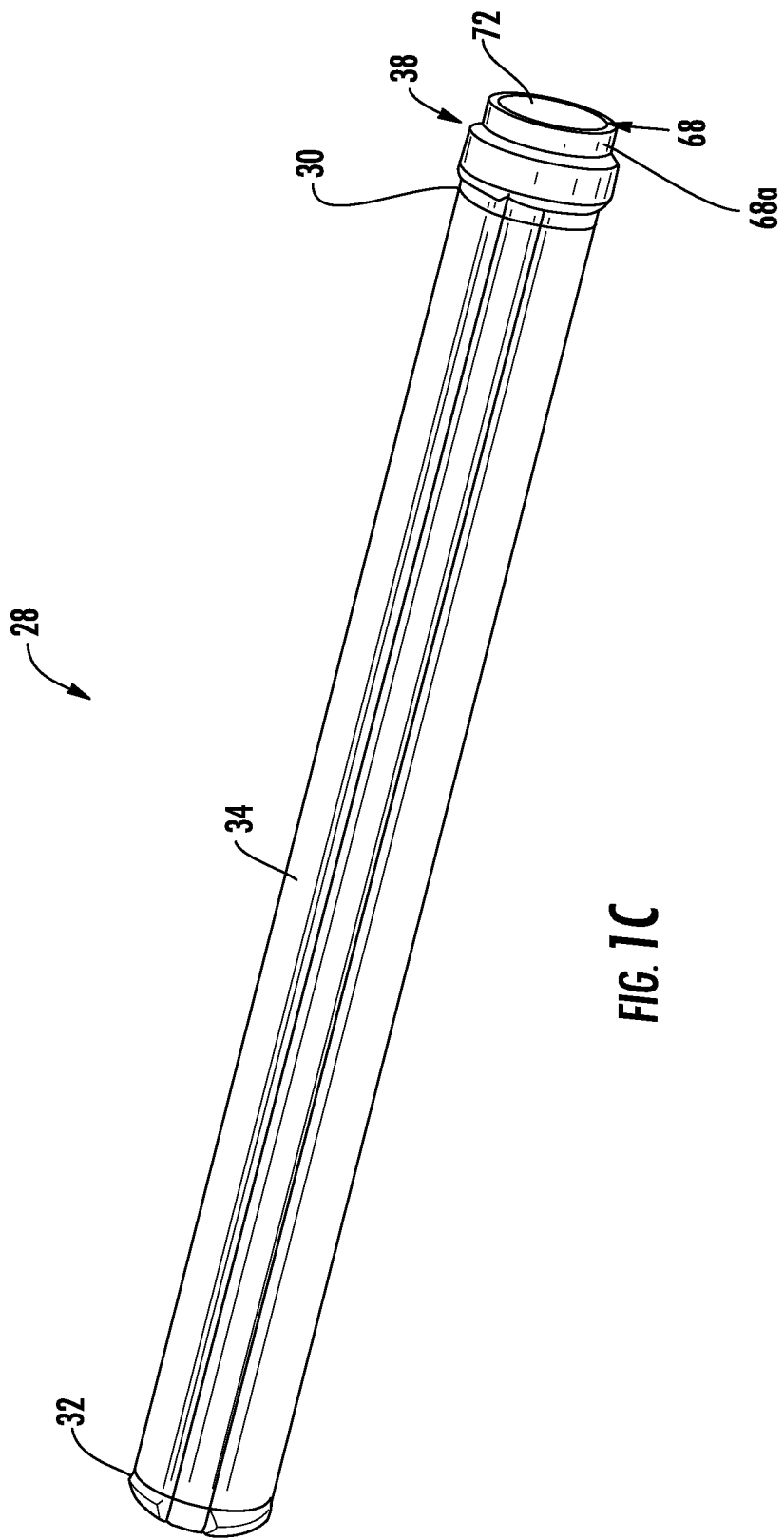
FIG. 1C shows a perspective view of an OPC drum that may be used in the printer cartridge of FIG. 1A.

FIG. 1B shows a close-up, side perspective view of the printer cartridge 10 of FIG. 1A having a printer cartridge component 36 of which embodiments of a device 80 (see FIGS. 3A, 4A, 5A, 12A) and a method 200 (see FIG. 10) and a method 250 (see FIG. 11) of the disclosure may be applied. The printer cartridge component 36 preferably comprises a drum gear assembly 36a (see FIG. 1B) comprising the drum drive gear 38 and the drive axle 40. As shown in FIG. 1B, the drum gear assembly 36a is attached within the opening 26 in the gear end 16a of the printer cartridge 10. FIG. 1C shows a perspective view of an OPC drum 28 that may be used in the printer cartridge 10 of FIG. 1A.

The invention may be embodied in a device (see FIGS. 3A, 4A, 5A, 12A) for remanufacturing a printer cartridge component 36 (see FIG. 1B). The printer cartridge component 36 (see FIG. 1B) is preferably a drum gear assembly 36a (see FIG. 1B) configured for attachment to an OPC drum 28 (see FIGS. 1A, 1C). The OPC drum 28 is configured for use in a printer cartridge 10 (see FIG. 1A). The printer cartridge 10 (see FIG. 1A) preferably comprises the OPC drum 28 (see FIG. 1A) with the drum gear assembly 36a (see FIG. 1B) coupled to the OPC drum 28 (see FIGS. 1B, 1C). The drum gear assembly 36a (see FIG. 1B) has the drum drive gear 38 (see FIGS. 1B, 2A) and the drive axle 40 (see FIGS. 1B, 2B) configured for attachment to the drum drive gear 38 (see FIGS. 1B, 2A). As shown in FIG. 1B, the drum gear assembly 36a has the drum drive gear 38 and the drive axle 40 attached to the drum drive gear 38.

Figure 2B:
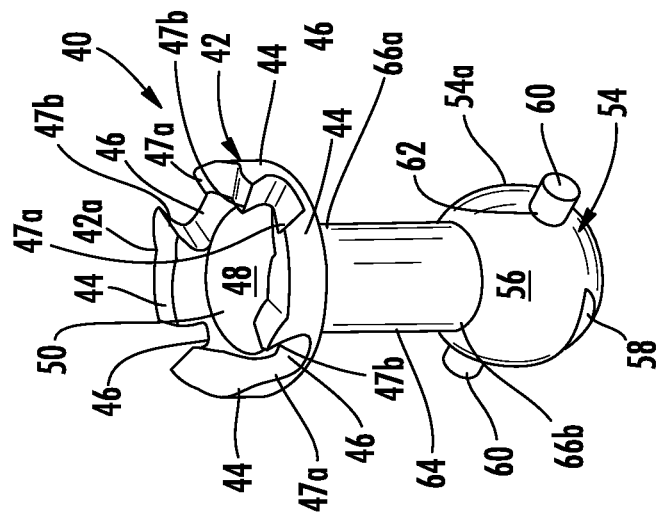
FIG. 2B shows a top perspective view of an embodiment of a drive axle of a drum gear assembly of which embodiments of a device and a method of the disclosure may be applied.
Figure 2A:
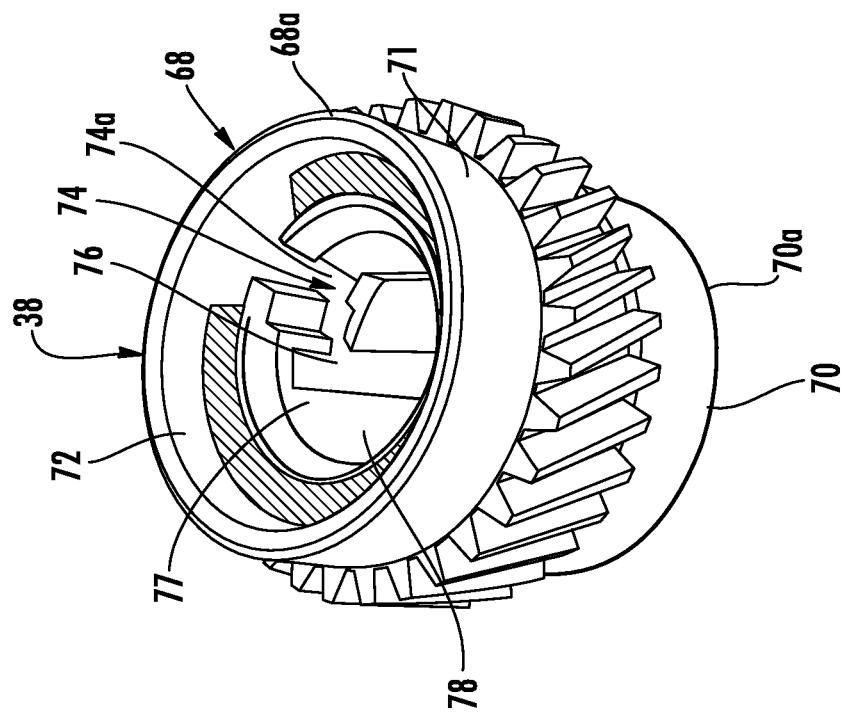
FIG. 2A shows a top perspective view of an embodiment of a drum drive gear of a drum gear assembly of which embodiments of a device and a method of the disclosure may be applied.

FIG. 2A shows a top perspective view of an embodiment of a drum drive gear 38 of the drum gear assembly 36a (see FIG. 1B) of which embodiments of a device 80 (see FIGS. 3A, 4A, 5A, 12A) and a method 200 (see FIG. 10) and a method 250 (see FIG. 11) of the disclosure may be applied. As shown in FIG. 2A, the drum drive gear 38 comprises a first end 68, such as in the form of a drive axle engagement end 68a, comprises a second end 70, such as in the form of a drum engagement end 70a, and comprises a body portion 71 in between the first end 68 and the second end 70. The drum drive gear 38 further comprises a central opening 72 for receiving the drive axle 40, and one or more pin element receiving portions 74, such as in the form of openings 74a, configured to receive one or more pin elements 60 of the drive axle 40.

As further shown in FIG. 2A, the drum drive gear 38 comprises one or more groove portions 76 formed in an interior portion 77 of the drum drive gear 38. The one or more groove portions 76 are preferably configured to snap fit the one or more pin elements 60 within the drum drive gear 38. As further shown in FIG. 2A, the drum drive gear 38 comprises an interior rounded portion 78 designed to receive a second end 54 of the drum drive gear 38.

FIG. 2B shows a top perspective view of an embodiment of a drive axle 40 of a drum gear assembly 36a (see FIG. 1B) of which embodiments of a device 80 (see FIGS. 3A, 4A, 5A, 12A) and a method 200 (see FIG. 10) and a method 250 (see FIG. 11) of the disclosure may be applied. As shown in FIG. 2B the drive axle 40 has a first end 42, such as in the form of tool engagement end 42a. The first end 42 has teeth portions 44 with cut-out portions 46 between the teeth portions 44. Each tooth portion 44 has sides 47a and 47b.

The drive axle 40 (see FIG. 2B) further has a recessed portion 48 at a central portion 50 of the first end 42. The recessed portion 48 is surrounded by the teeth portions 44 and the cut-out portions 46. The drive axle 40 (see FIG. 2B) further has a neck portion 52 (see FIG. 3J) at the first end 42.

As further shown in FIG. 2B, the drive axle 40 has a second end 54, such as in the form of a drum drive gear engagement end 54a. The second end 54 comprises a rounded portion 56 having one or more notched portions 58, and one or more openings 62 for receiving one or more pin elements 60. As further shown in FIG. 2B, the drive axle 40 comprises a body portion 64 having a first end 66a and a second end 66b.

The invention may be embodied in a device 80 (see FIGS. 3A, 4A, 5A, 12A) for remanufacturing the printer cartridge component 36 (see FIG. 1B), such as in the form of the drum gear assembly 36a (see FIG. 1B) configured for attachment to OPC drum 28 (see FIG. 1C) which is configured for use in a printer cartridge 10 (see FIG. 1A).

Figure 3A:
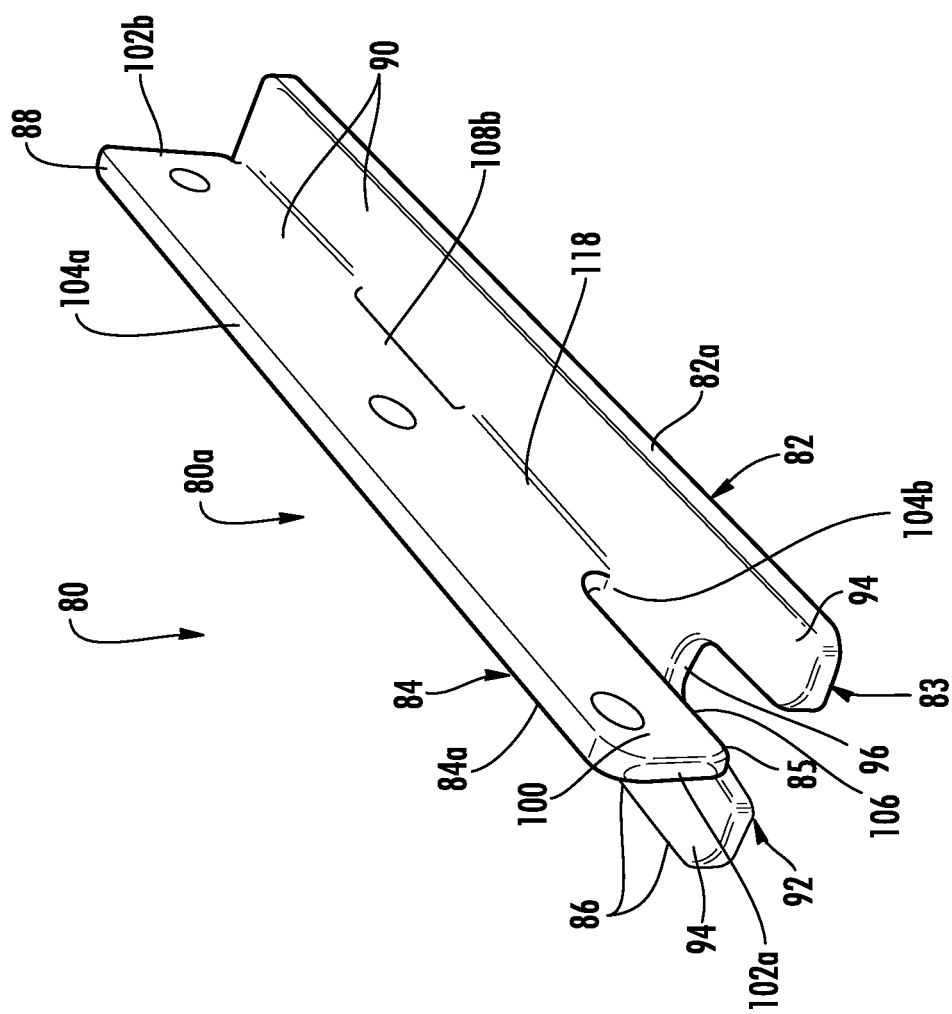
FIG. 3A is a right side perspective view of an embodiment of a device for remanufacturing a printer cartridge component of the disclosure.

FIG. 3A is a right side perspective view of an embodiment of a device 80, such as in the form of horizontal tool 80a, for remanufacturing a printer cartridge component 36 (see FIG. 1B) of the disclosure.

As shown in FIG. 3A, the device 80, such as in the form of horizontal tool 80a, comprises a first portion 82, such as in the form of a first portion 82a. The first portion (see FIG. 3A) has a drive axle engagement end 83 configured to engage the drive axle 40 (see FIG. 2B). As further shown in FIG. 3A, the device 80, such as in the form of horizontal tool 80a, comprises a second portion 84, such as in the form of a second portion 84a, coupled to the first portion 82. In one embodiment, the second portion 84 is directly coupled to the first portion 84. As further shown in FIGS. 3A and 3F, the second portion 84 is coupled to the first portion by angled portion 118. In one As further shown in FIG. 3A, the second portion 84 has a teeth engagement portion 85 to engage one or more of the teeth portions 44 (see FIG. 2B) of the drive axle 40 (see FIG. 2B). The first portion 82 and the second portion 84 are configured for assembling and disassembling the drum gear assembly 36a (see FIG. 1B).

In one embodiment, as shown in FIG. 3A, the device has a first end 86, a second end 88, and an elongated body portion 90 between the two ends. As shown, in one embodiment, the drive axle engagement end 83 comprises a U-shaped fork portion 92 configured to engage the first end 42 of the drive axle 40. As shown in FIG. 3A, the U-shaped fork portion 92 may comprise tines 94 and a central U-shaped opening 96 configured for receiving the neck portion 52 (see FIG. 3J) of the first end 42 (see FIG. 3J) of the drive axle 40 (see FIG. 3J) when the drive axle 40 is in an engaged or attached position 120 (see FIG. 3F) with the device 80.

As further shown in FIG. 3A, in one embodiment, the teeth engagement portion 85 comprises a center protrusion portion 100 configured to engage one or more teeth portions 44 formed in the first end 42 of the drive axle 40. As shown in FIG. 3A, the center protrusion portion 100 comprises a first end 102a, a second end 102b, a top portion 104a, a bottom portion 104b, elongated sides 108a and 108b, and an engagement portion 106 for engaging the engagement surface 49 of the cut-out portion 46 and for engaging the sides 47a and 47b of the teeth portions 44.

The first portion 82 and the second portion 84 are preferably configured to remove the drive axle 40 from the drum drive gear 38 and are configured to attach the drive axle 40 to the drum drive gear 38. The device 80 is preferably comprised of a material such as one or more of stainless steel, copper aluminum, brass, acrylic, resilient plastic, wood, bamboo, or a mixture thereof, or another suitable material that has sufficient strength to rotate the drive axle 40.

Figure 3F:
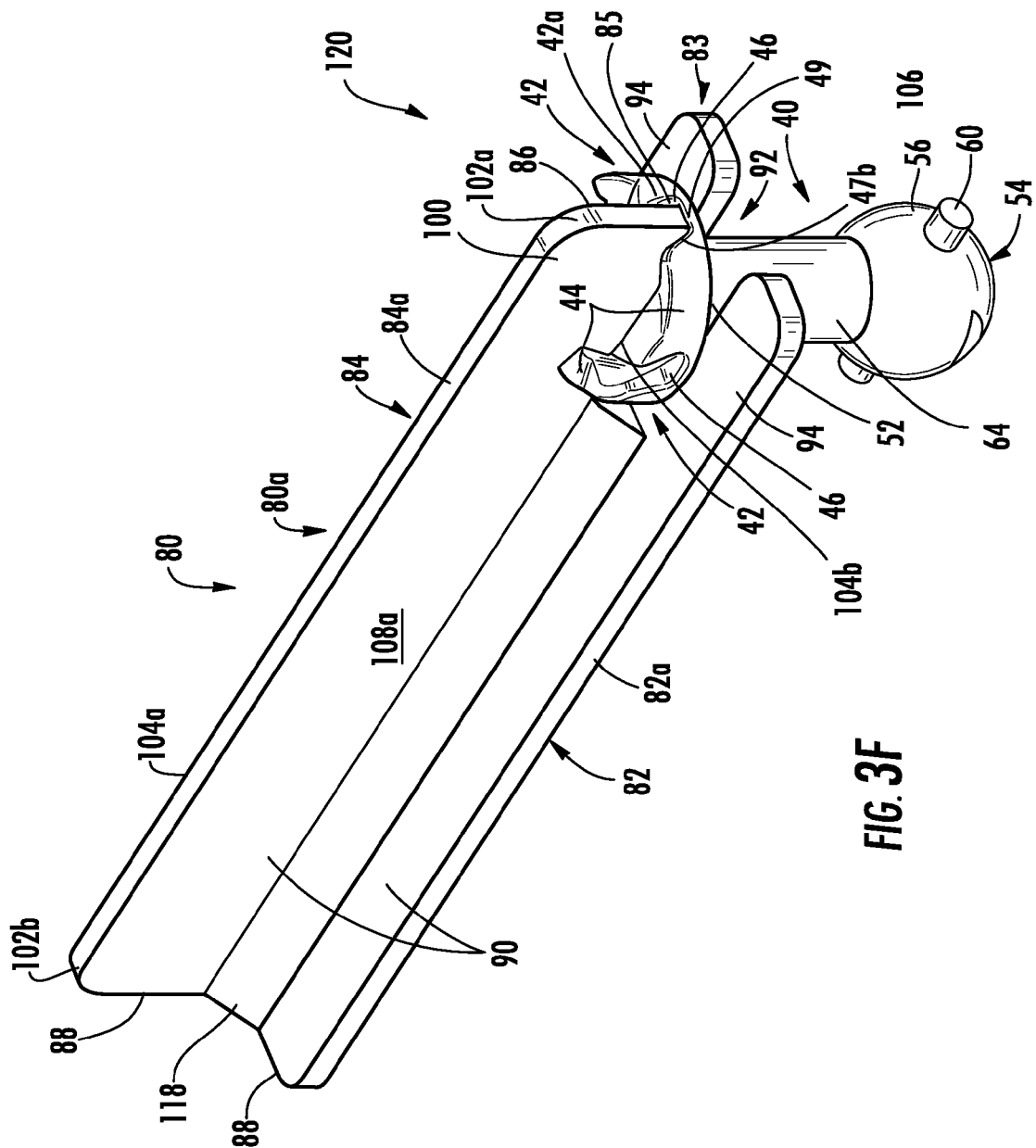
FIG. 3F is a left side perspective view of the device of FIG. 3A engaged or attached to an embodiment of a drive axle of a drum gear assembly.

FIG. 3B is a right side perspective view of the device 80, such as in the form of 80a, of FIG. 3A. FIG. 3C is a top view of the device 80, such as in the form of 80a, of FIG. 3A. FIG. 3D is a left side view of the device 80, such as in the form of 80a, of FIG. 3A. FIG. 3E is a front view of the device of FIG. 3A. FIG. 3F is a left side perspective view of the device 80, such as in the form of 80a, of FIG. 3A engaged or attached to an embodiment of a drive axle 40 of a drum gear assembly 36a. FIG. 3G is a right side perspective view of the device 80, such as in the form of 80a, with attached drive axle 40 of FIG. 3F in the engaged or attached position 120. FIG. 3H is a top view of the device 80, such as in the form of 80a, with attached drive axle of FIG. 3F in the engaged or attached position 120. FIG. 3I is a left view of the device 80, such as in the form of 80a, with attached drive axle of FIG. 3F in the engaged or attached position 120. FIG. 3J is a front view of the device 80, such as in the form of 80a, with attached drive axle 40 of FIG. 3F in the engaged or attached position 120.

Figure 4A:
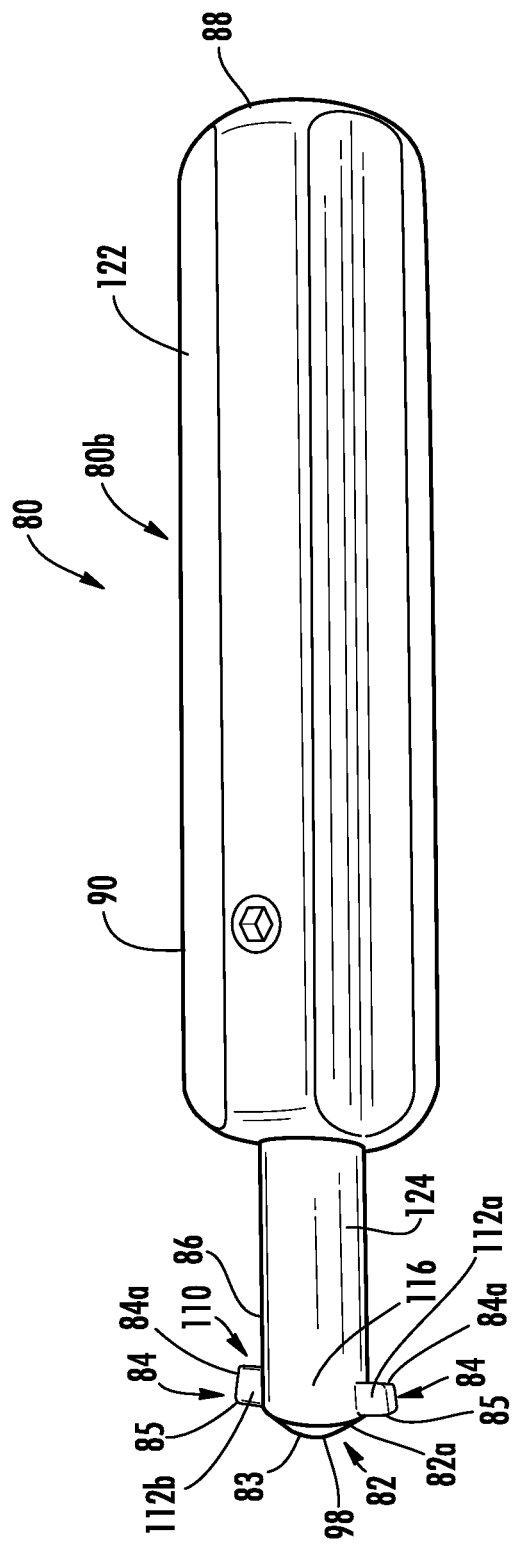
FIG. 4A is a front perspective view of an embodiment of a device for remanufacturing a printer cartridge component of the disclosure.

FIG. 4A is a front perspective view of another embodiment of a device 80, such as in the form of vertical tool 80b with two projecting portions 110, for remanufacturing a printer cartridge component 36 of the disclosure. As shown in FIG. 4A, in another embodiment the device has a first end 86, a second end 88, and an elongated body portion 90 between the two ends. As shown, in one embodiment, there is a handle portion 122, and a shaft portion 124 on the drive axle engagement end 83 which comprises a tip portion 98 that may be rounded or flat or another suitable configuration and configured to engage the first end 42 of the drive axle 40. As shown in FIG. 4A, in another embodiment the teeth engagement portion 85 comprises one or more projecting portions 110, configured to engage one or more teeth portions 44 formed in the first end 42 of the drive axle 40. The teeth engagement portion 85 may comprise two projecting portions 110, four projecting portions 110, or another suitable number of projection portions. The one or more projecting portions 110 preferably comprise one or more fins 110a having sloped sides 112a and 112b.

Figure 4I:
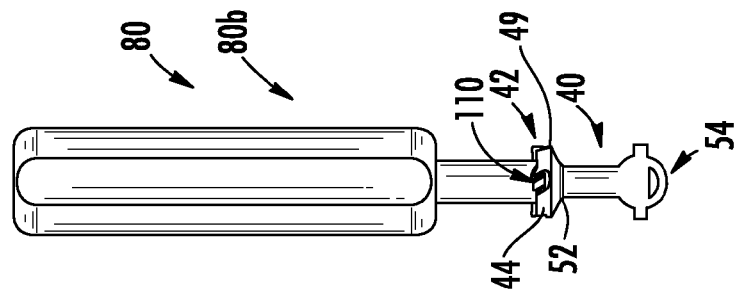
FIG. 4I is a right side view of the device with attached drive axle of FIG. 4G.
Figure 4H:
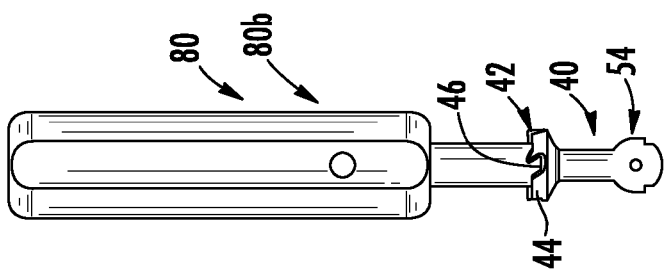
FIG. 4H is a front view of the device with attached drive axle of FIG. 4G.
Figure 4G:
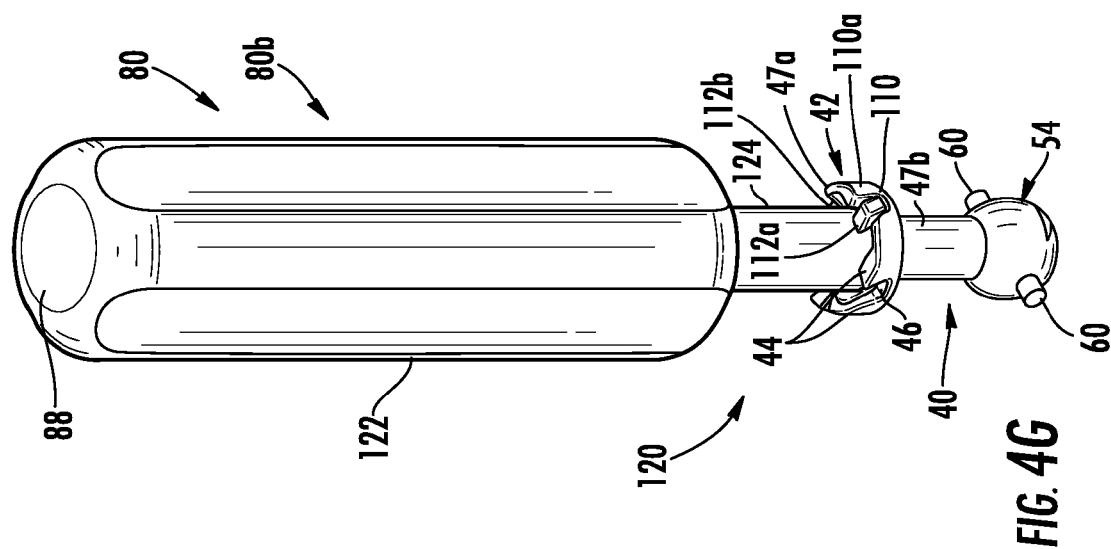
FIG. 4G is a right side perspective view of the device of FIG. 4A engaged or attached to an embodiment of a drive axle of a drum gear assembly.

FIG. 4B is a right side perspective view of the device 80, such as in the form of 80b, of FIG. 4A. FIG. 4C is a front view of the device 80, such as in the form of 80b, of FIG. 4A. FIG. 4D is a right side view of the device 80, such as in the form of 80b, of FIG. 4A. FIG. 4E is a top view of the device 80, such as in the form of 80b, of FIG. 4A. FIG. 4F is a bottom view of the device 80, such as in the form of 80b, of FIG. 4A. FIG. 4G is a right side perspective view of the device 80, such as in the form of 80b, of FIG. 4A in the engaged or attached position 120 to an embodiment of a drive axle 40 of a drum gear assembly 36a. FIG. 4H is a front view of the device 80, such as in the form of 80b, with drive axle 40 of FIG. 4G in the engaged or attached position 120. FIG. 4I is a right side view of the device 80, such as in the form of 80b, with drive axle 40 of FIG. 4G in the engaged or attached position 120.

Figure 5A:
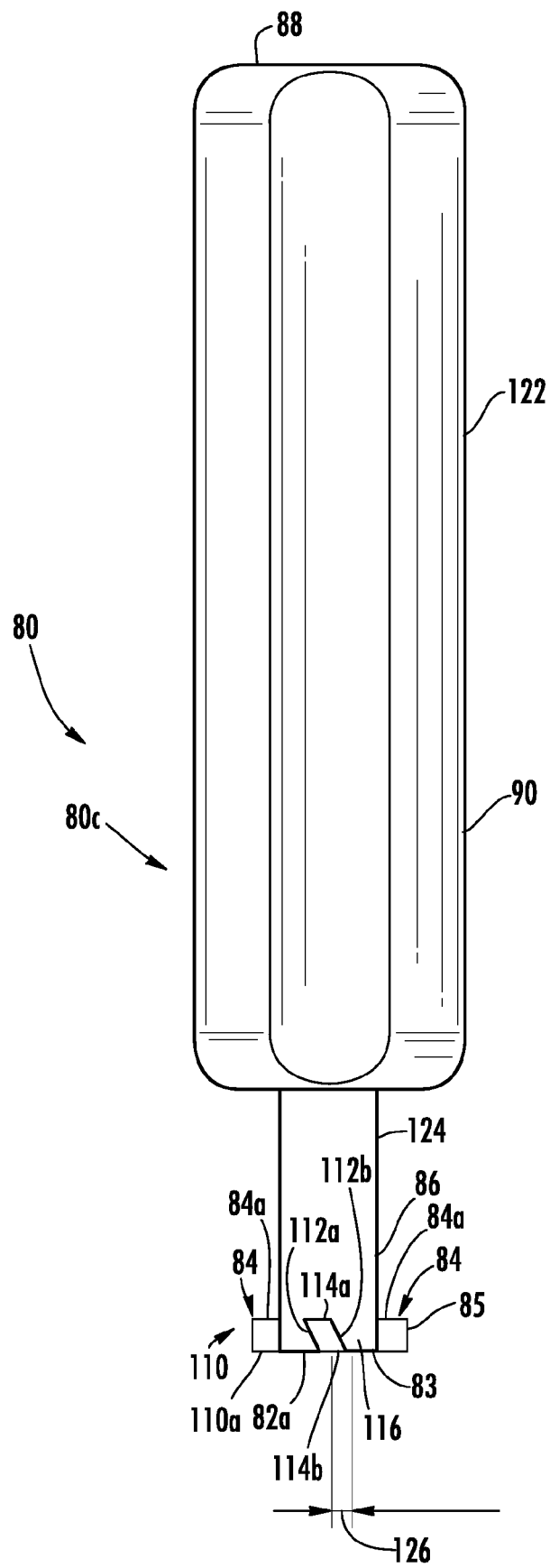
FIG. 5A is a front view of another embodiment of a device for remanufacturing a printer cartridge component of the disclosure.
Figure 5B:
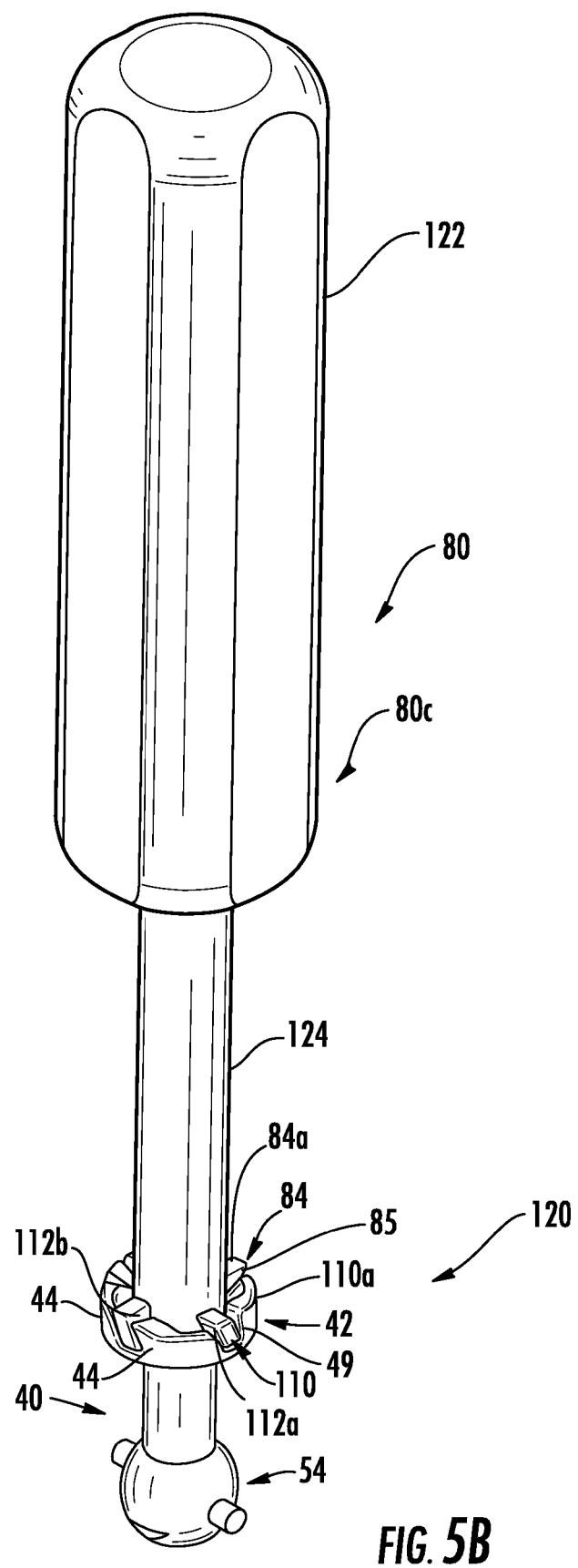
FIG. 5B is a right side perspective view of the device of FIG. 5A engaged or attached to an embodiment of a drive axle of a drum gear assembly.

FIG. 5A is a front view of another embodiment of a device 80, such as in the form of vertical tool 80c with four projecting portions 110, for remanufacturing a printer cartridge component 36 of the disclosure. In one embodiment, as shown, the device has a first end 86, a second end 88, and an elongated body portion 90 between the two ends. FIG. 5B is a right side perspective view of the device 80, such as in the form of vertical tool 80c with four projecting portions 110, of FIG. 5A engaged or attached to an embodiment of a drive axle 40 of a drum gear assembly 36a. The width of the projecting portion 126 may comprise any value relative to the size of the one of more teeth portions 44 or cut-out portions 46.

The teeth engagement portion 85 may comprise two projecting portions 110, four projecting portions 110, or another suitable number of projection portions. The one or more projecting portions 110 preferably comprise one or more fins 110a having sloped sides 112a and 112b.

Figure 12D:
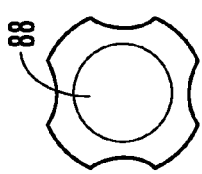
FIG. 12D is a top view of the device of FIG. 12A.
Figure 12E:
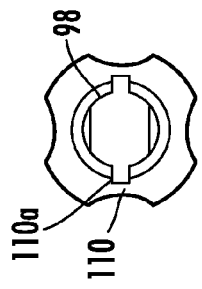
FIG. 12E is a bottom view of the device of FIG. 12A.
Figure 12F:
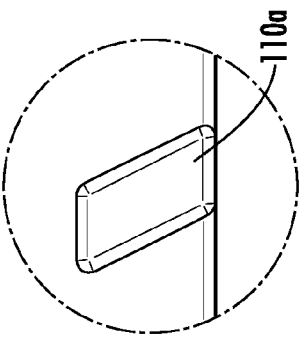
FIG. 12F is a close up view of a fin of the device of FIG. 12A.
Figure 12C:
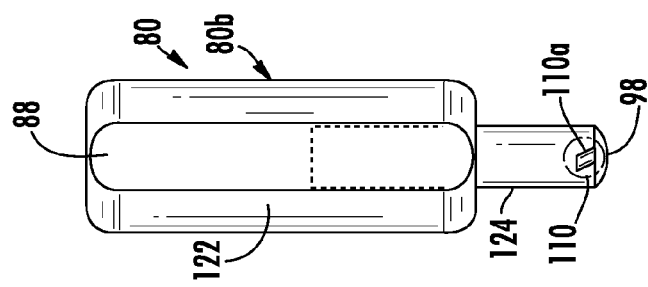
FIG. 12C is a right side view of the device of FIG. 12A.
Figure 12B:
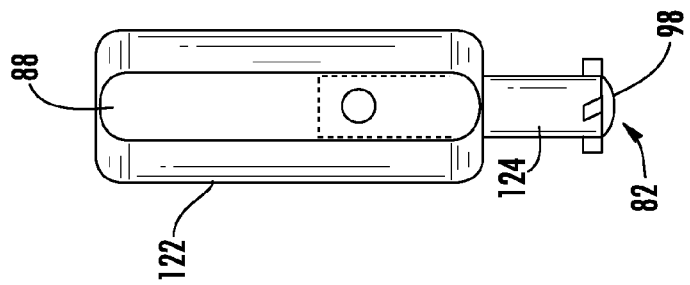
FIG. 12B is a front view of the device of FIG. 12A.
Figure 12A:
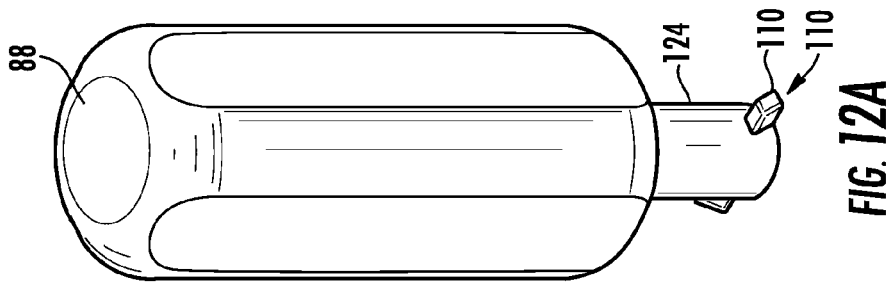
FIG. 12A is a right side perspective view of an embodiment of a device for remanufacturing a printer cartridge component of the disclosure.

FIG. 12A is a right side perspective view of the preferred embodiment of a device 80, such as in the form of vertical tool 80b or 80c with projecting portions 110, for remanufacturing a printer cartridge component 36 of the disclosure. The embodiment of the vertical tool in FIG. 12A has similar, though not identical parts, to the embodiments of the devices in FIGS. 4A and 5A. The drive axle engagement end 83 comprises a tip portion 98 that may be rounded or flat or another suitable configuration and configured to engage the first end 42 of the drive axle 40. As shown in FIG. 4A, in another embodiment the teeth engagement portion 85 comprises one or more projecting portions 110, configured to engage one or more teeth portions 44 formed in the first end 42 of the drive axle 40. The teeth engagement portion 85 may comprise two projecting portions 110, four projecting portions 110, or another suitable number of projection portions. The one or more projecting portions 110 preferably comprise one or more fins 110a having sloped sides 112a and 112b.

Figure 12I:
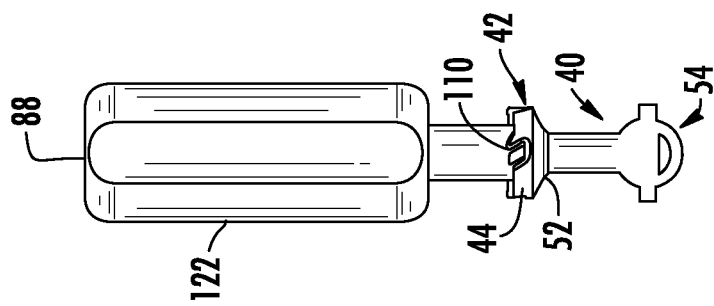
FIG. 12I is a right side view of the device with attached drive axle of FIG. 12A.
Figure 12H:
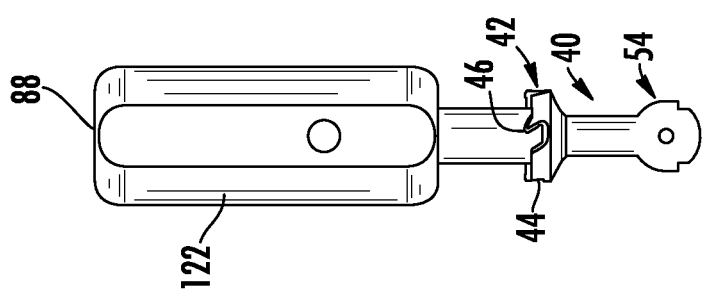
FIG. 12H is a front view of the device with attached drive axle of FIG. 12A.
Figure 12G:
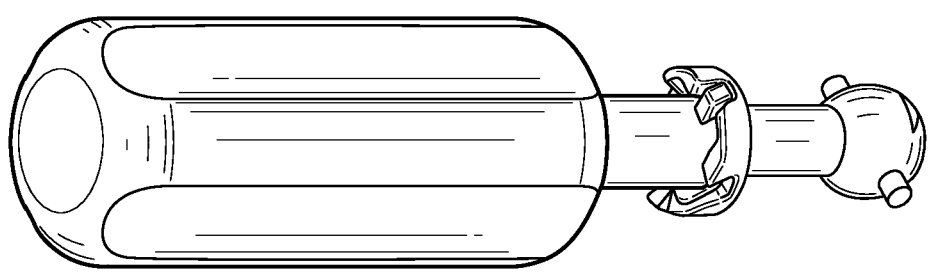
FIG. 12G is a right perspective view of the device of FIG. 12A engaged or attached to an embodiment of a drive axle of a drum gear assembly.
Figure 14C:
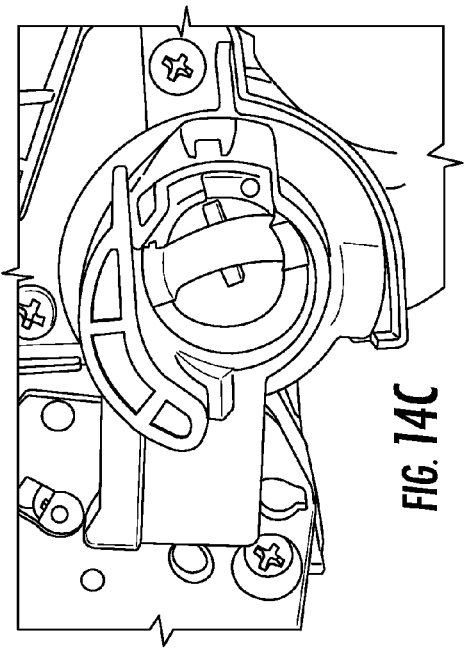
Figure 14E:
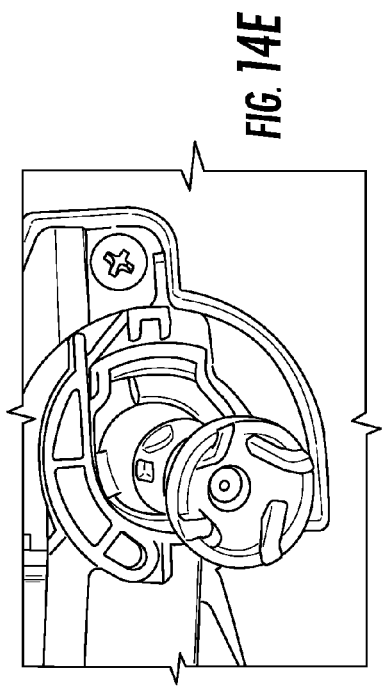
Figure 14B:
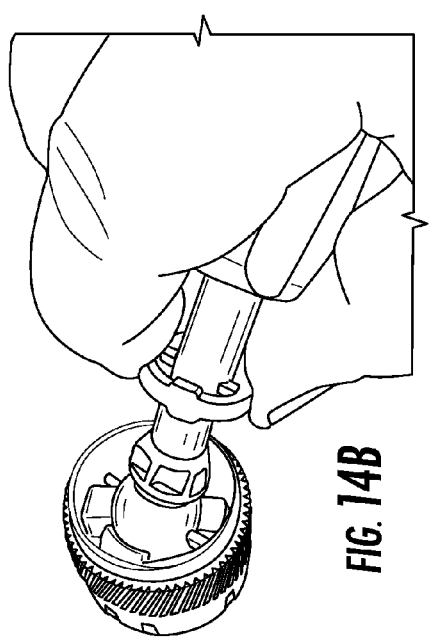
Figure 14D:
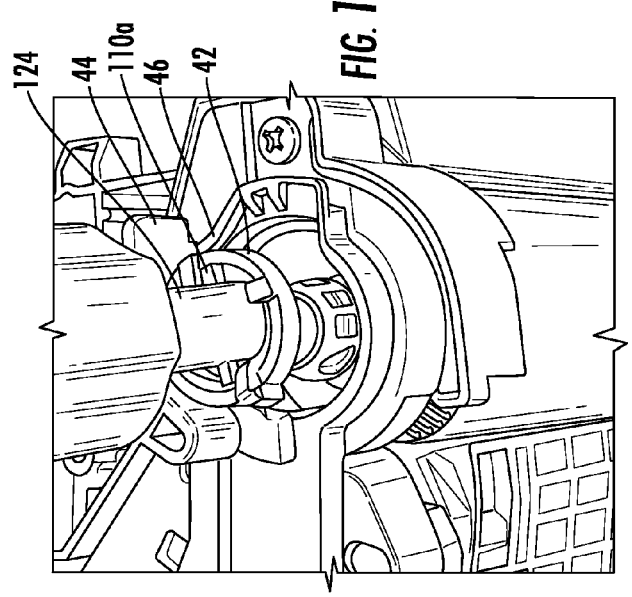

FIG. 12B is a front view of the device 80, such as in the form of 80b or 80c, of FIG. 12A. FIG. 12C is a right side view of the device 80, such as in the form of 80b or 80c, of FIG. 12A. FIG. 12D is a top view of the device 80, such as in the form of 80b or 80c, of FIG. 12A. FIG. 12E is a bottom view of the device 80, such as in the form of 80b or 80c, of FIG. 12A. FIG. 12F is a close up view of a fin of the device of FIG. 12A; FIG. 12G is a right perspective view of the device 80, such as in the form of 80b or 80c, of FIG. 12A engaged or attached to an embodiment of a drive axle of a drum gear assembly 36a. FIG. 12H is a front view of the device 80, such as in the form of 80b or 80c, with attached drive axle 40 of FIG. 12G. FIG. 12I is a right side view of the device 80, such as in the form of 80b or 80c, with attached drive axle 40 of FIG. 12G.

Figure 6A:
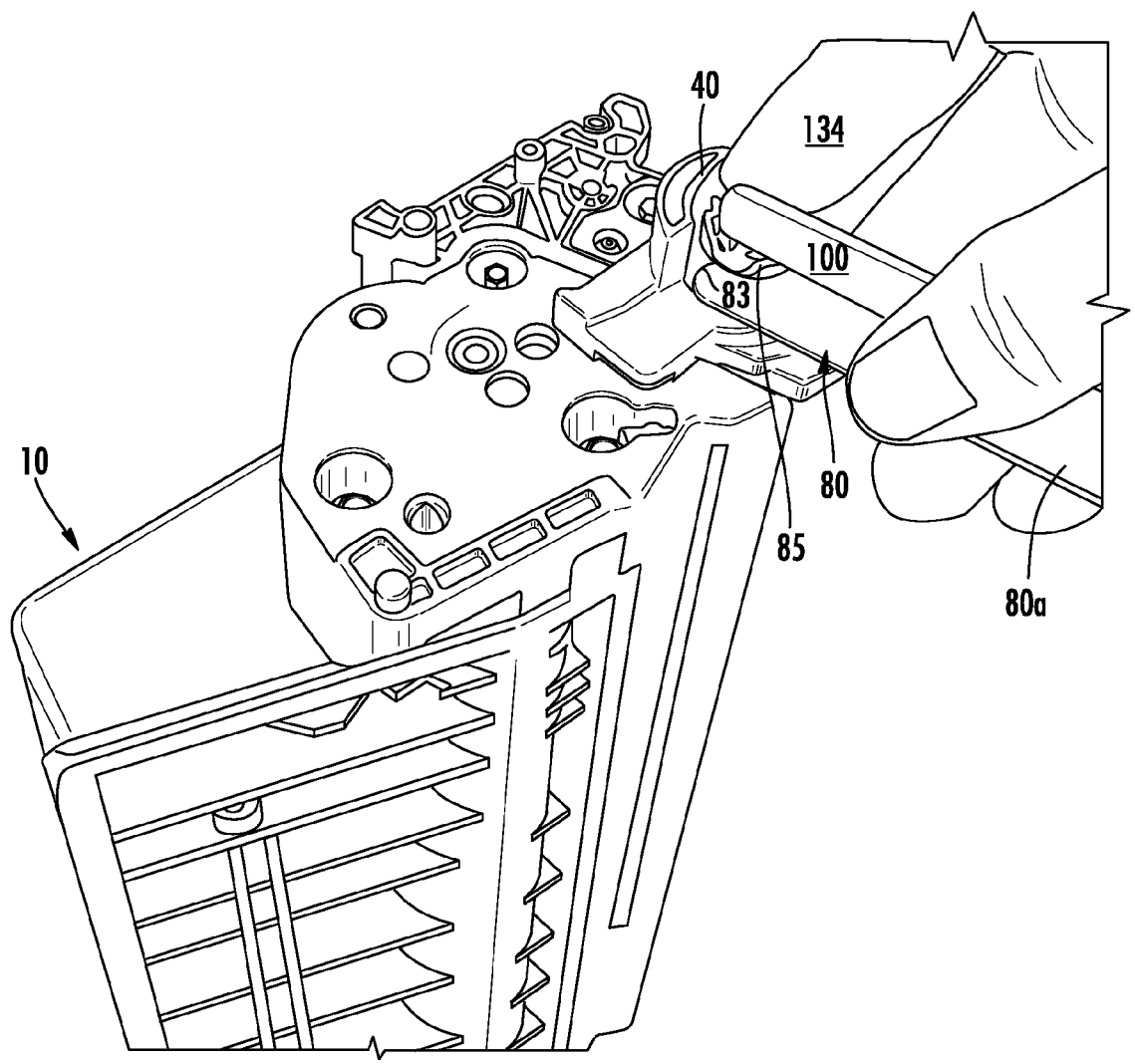
FIG. 6A shows a close-up, side perspective view of the printer cartridge of FIG. 1A with an embodiment of a device used in disassembling a drum gear assembly in one of the embodiments of a method of the disclosure.
Figure 6B:
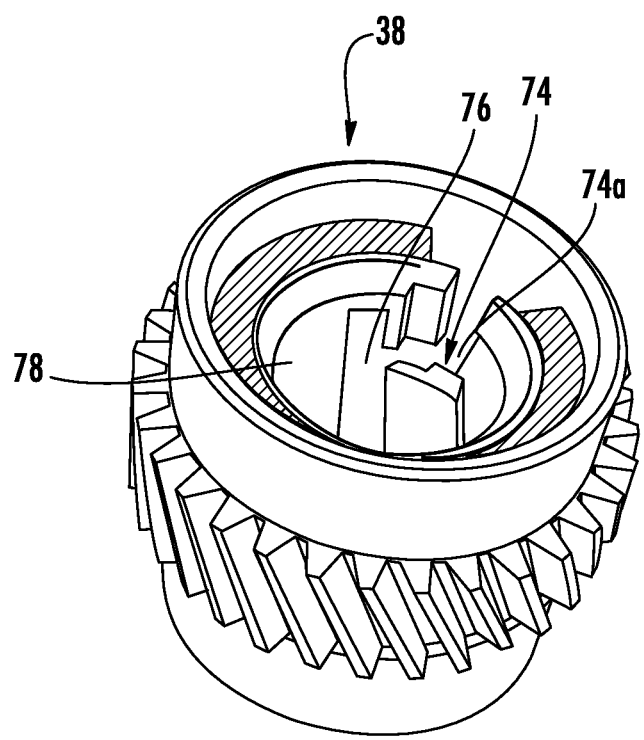
FIG. 6B shows a top perspective view of an embodiment of a drum drive gear of a drum gear assembly of which embodiments of a device and a method of the disclosure may be applied.
Figure 6C:
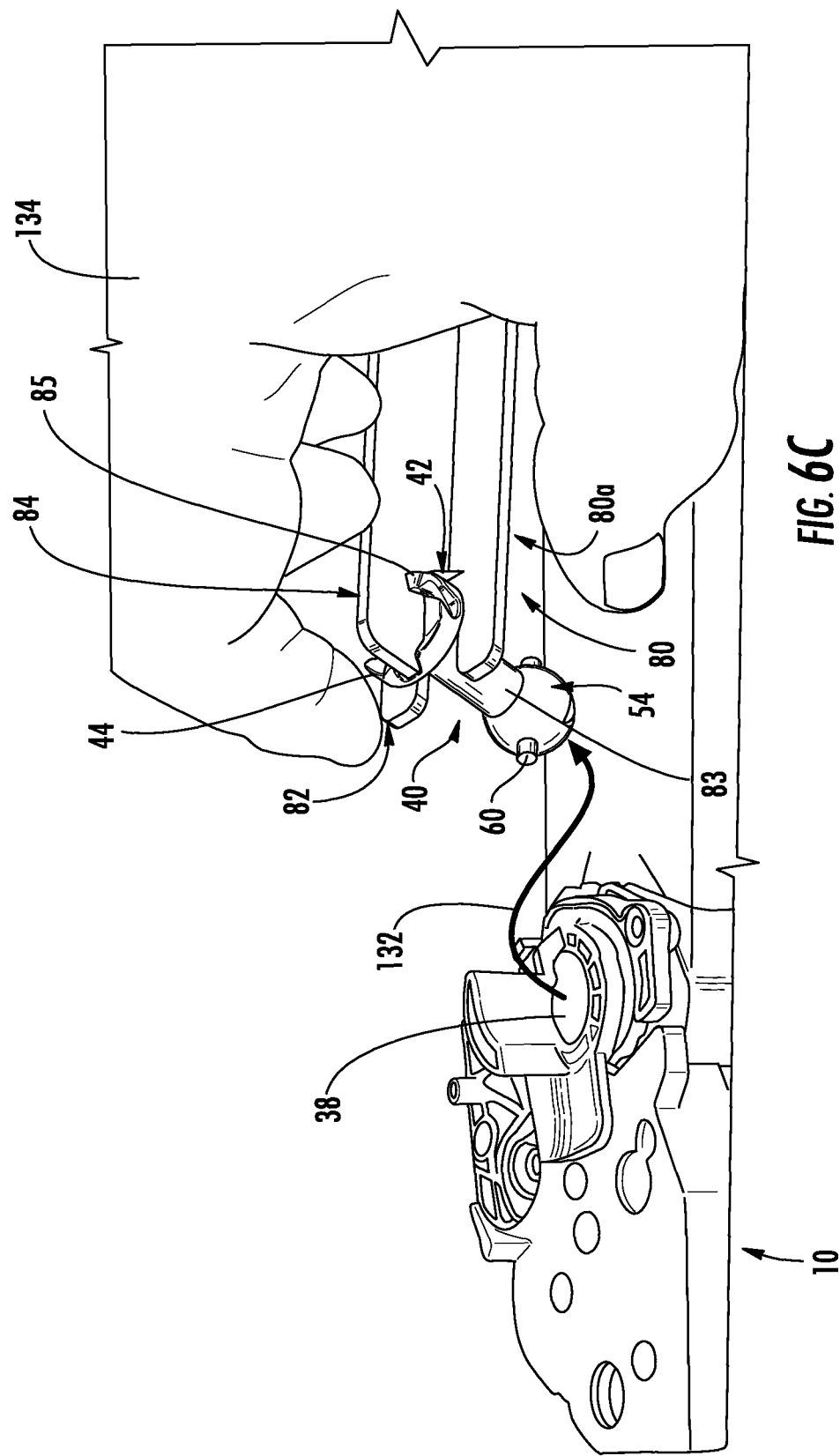
FIG. 6C shows an embodiment of a device and method used in disassembling a drum gear assembly in one of the embodiments of a method of the disclosure.

FIGS. 6A-6C show views of an embodiment of a device 80, such as in the form of horizontal tool 80a, used in disassembling a drum gear assembly in one of the embodiments of a method of the disclosure. In one embodiment, the removal 132 is performed by an operator 134.

Figure 7B:
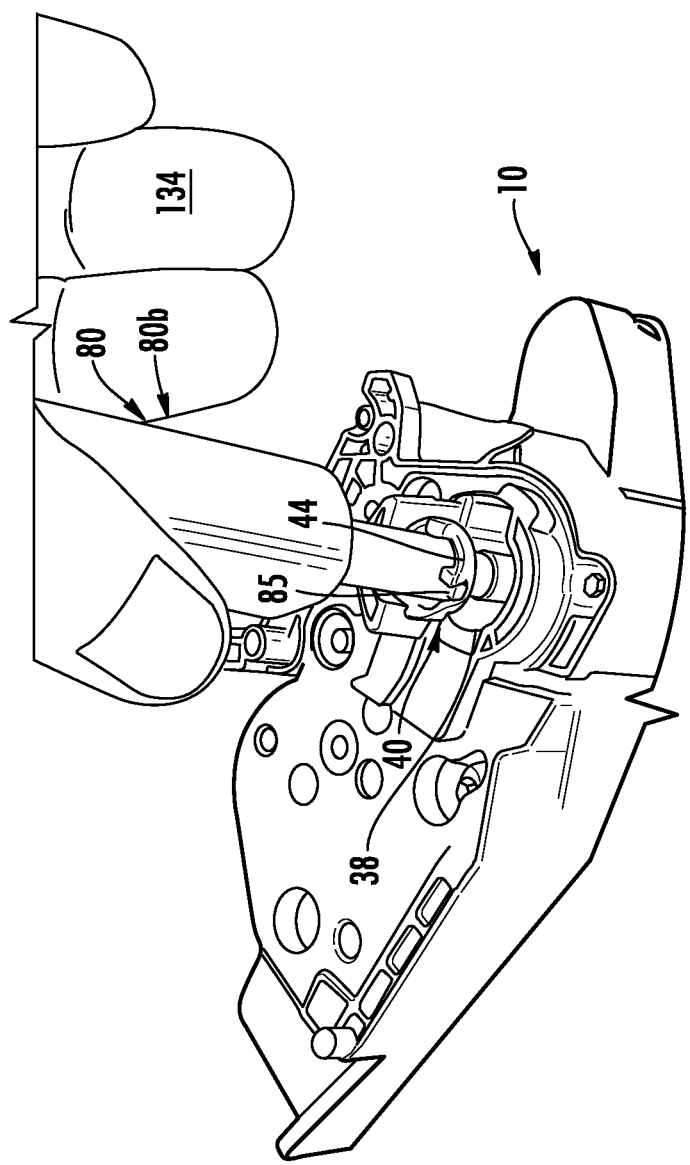
FIG. 7B shows a close-up, side perspective view of the printer cartridge of FIG. 1A with an embodiment of a device used in disassembling a drum gear assembly in one of the embodiments of a method of the disclosure.
Figure 7C:
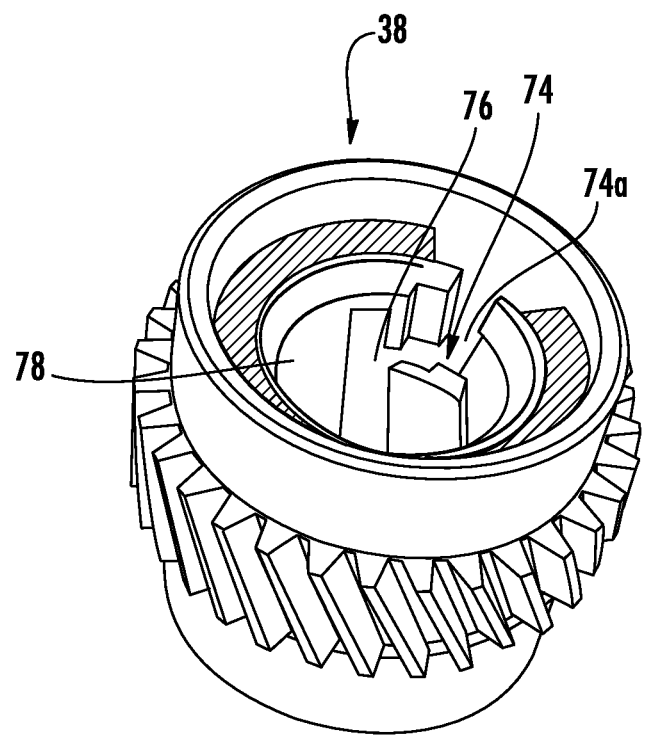
FIG. 7C shows a top perspective view of an embodiment of a drum drive gear of a drum gear assembly of which embodiments of a device and a method of the disclosure may be applied.

FIGS. 7A-7C show views of another embodiment of a device 80, such as in the form of vertical tool 80, such as in the form of vertical tool 80b or vertical tool 80c, used in disassembling a drum gear assembly in one of the embodiments of a method of the disclosure. In one embodiment, the engagement or attachment 136 is performed by an operator 134.

Figure 8A:
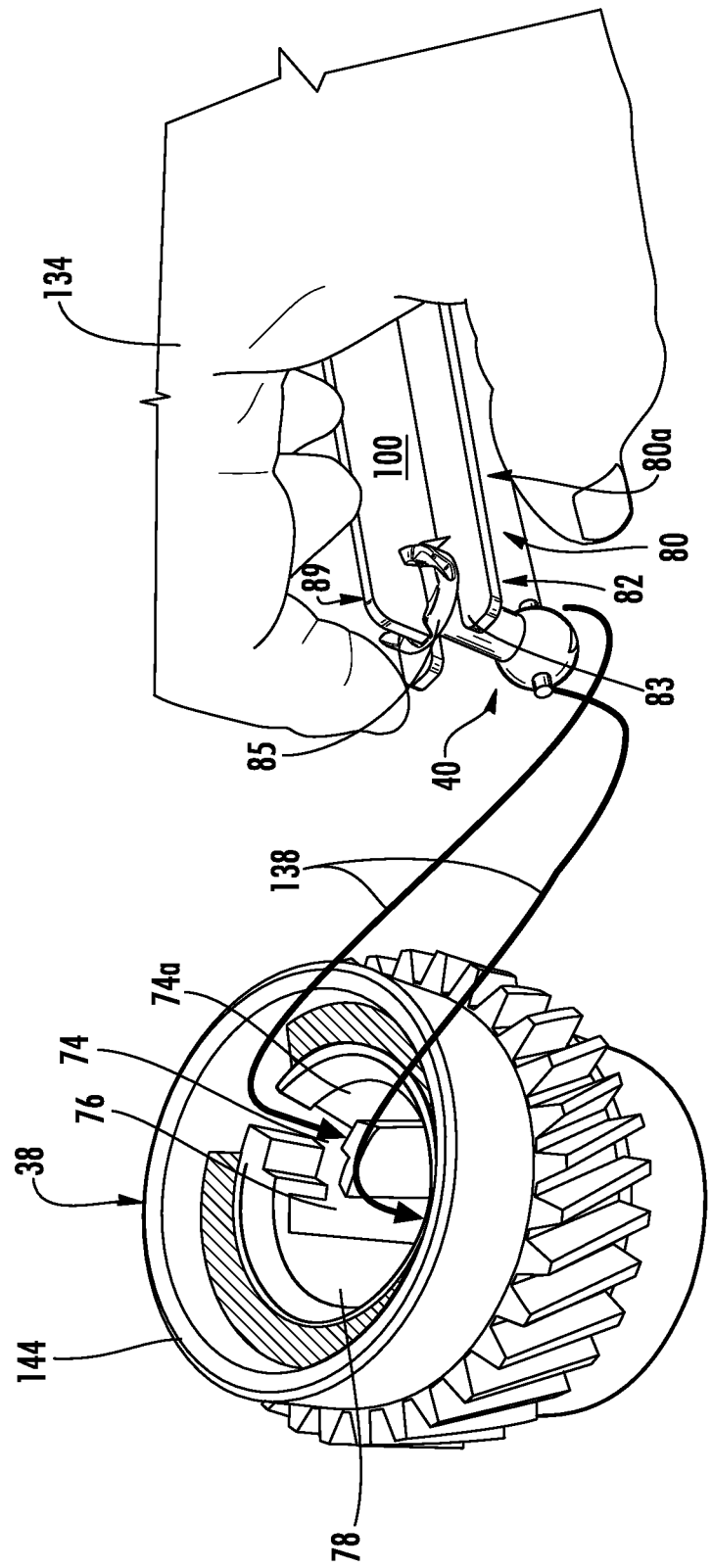
FIG. 8A shows an embodiment of a device and method used in assembling a drum gear assembly in one of the embodiments of a method of the disclosure.
Figure 8B:
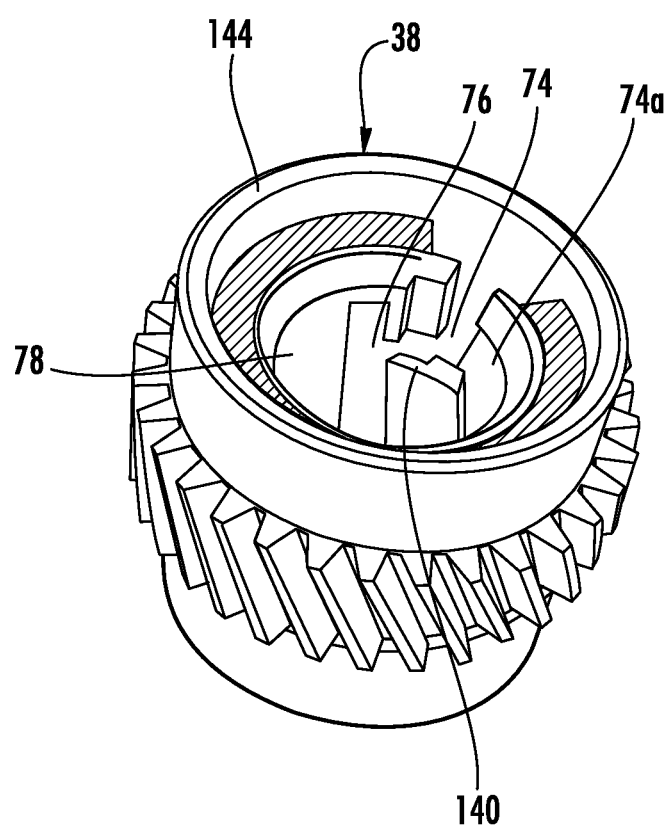
FIG. 8B shows a top perspective view of an embodiment of a drum drive gear of a drum gear assembly of which embodiments of a device and a method of the disclosure may be applied.
Figure 8C:
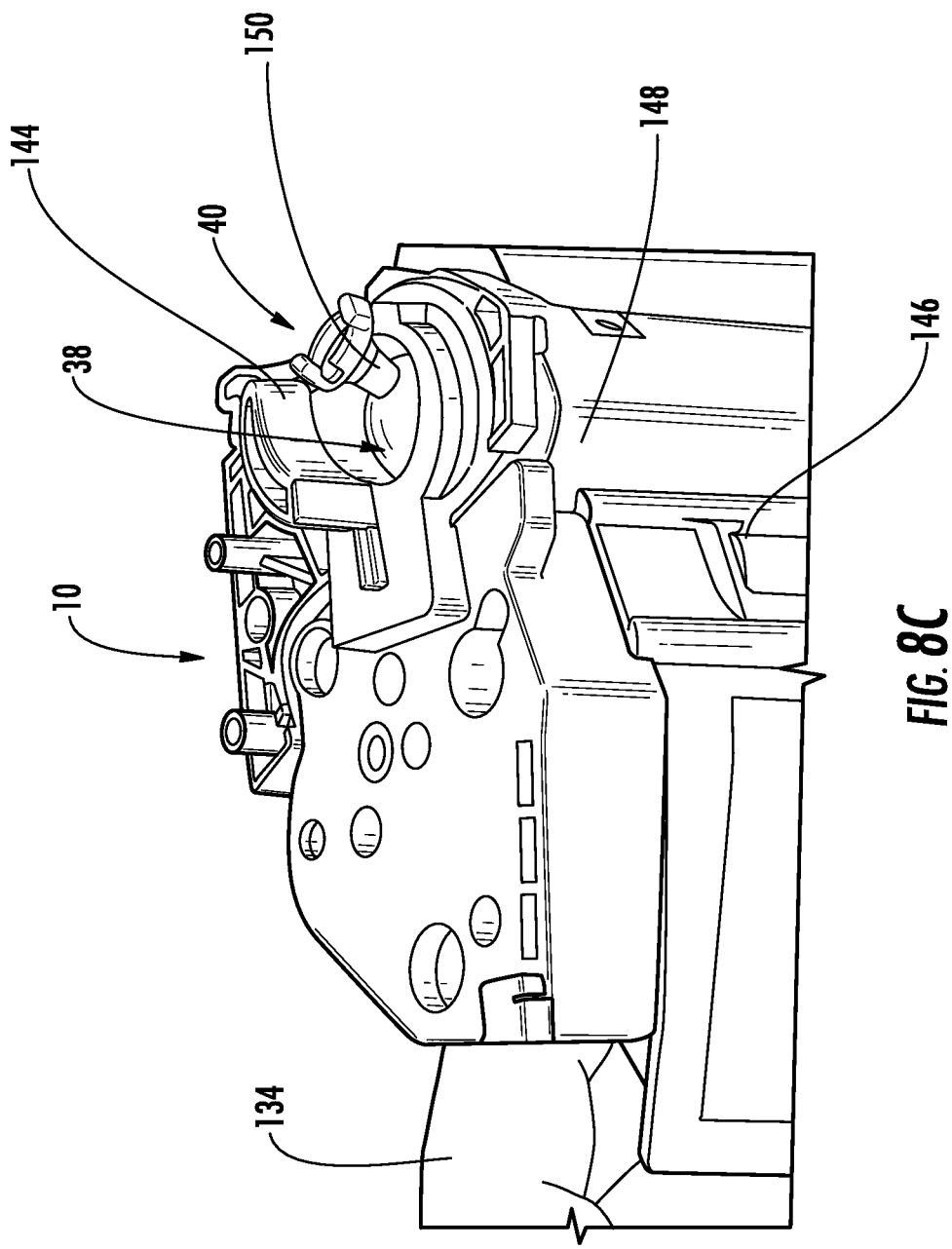
FIG. 8C shows an embodiment of a device and method used in assembling a drum gear assembly in one of the embodiments of a method of the disclosure.

FIGS. 8A-8C show views of an embodiment of a device 80, such as in the form of horizontal tool 80a, used in assembling a drum gear assembly in one of the embodiments of a method of the disclosure. In one embodiment, the engagement or attachment 138 is performed by an operator 134. In one embodiment, the printer cartridge component comprises any or all of a replacement OPC drum 146, a remanufactured assembled OPC drum 148, and/or a remanufactured drum gear assembly 150.

Figure 9A:
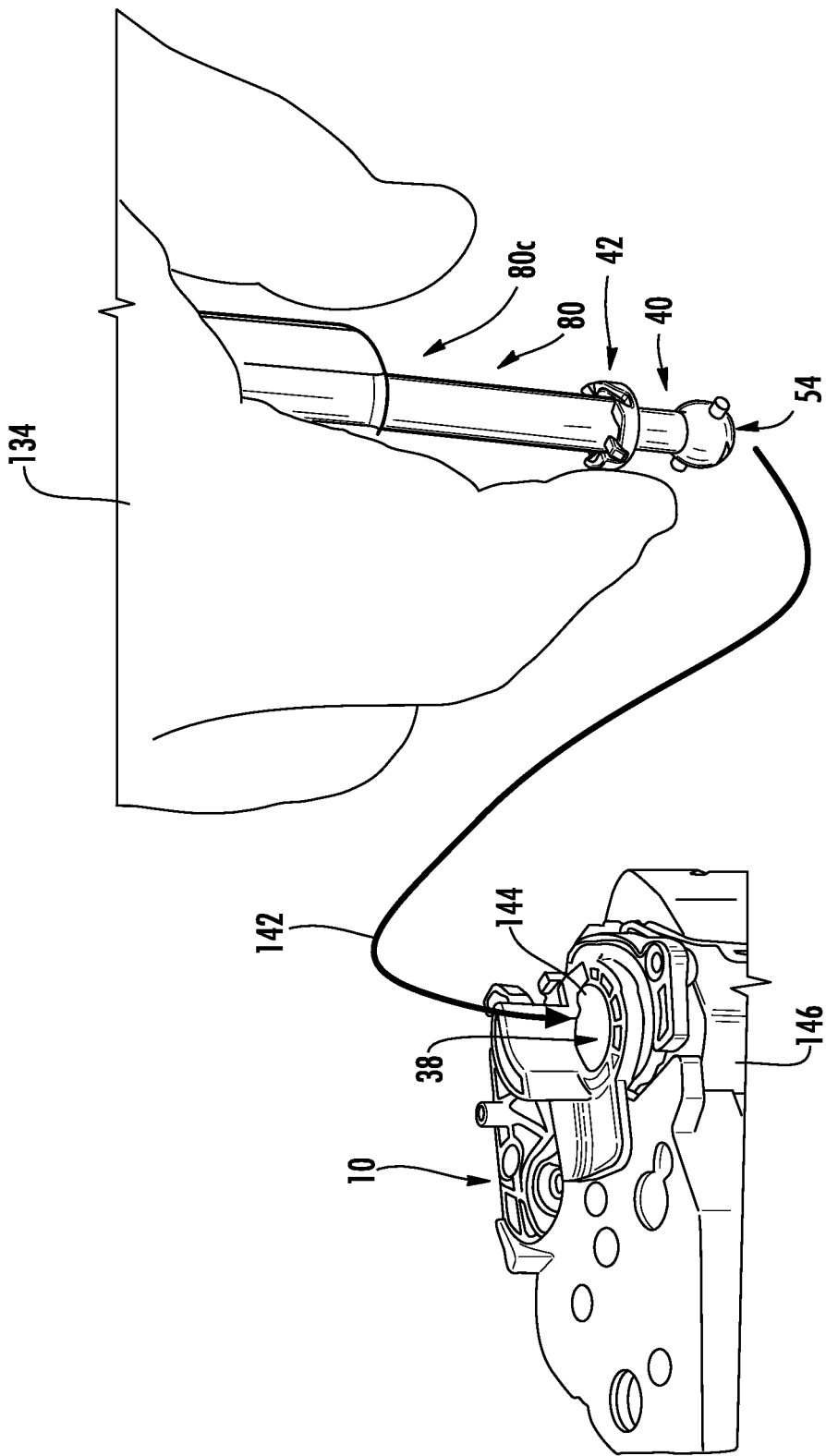
FIG. 9A shows views of an embodiment of a device and method used in assembling a drum gear assembly in one of the embodiments of a method of the disclosure.
Figure 9B:
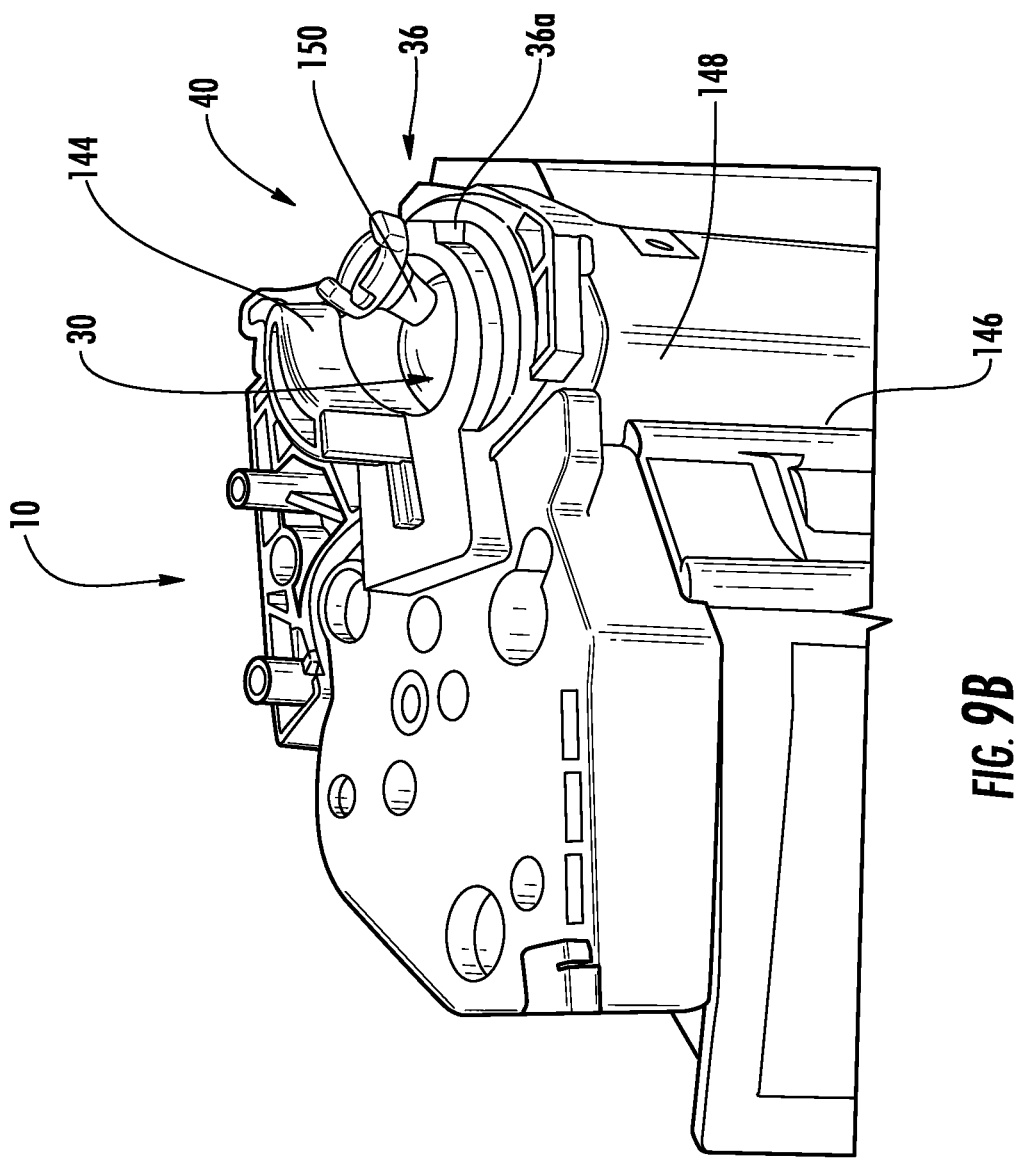
FIG. 9B shows an embodiment of a device and method used in assembling a drum gear assembly in one of the embodiments of a method of the disclosure.

FIGS. 9A-9B show views of another embodiment of a device 80, such as in the form of vertical tool 80b or vertical tool 80c, used in disassembling a drum gear assembly in one of the embodiments of a method of the disclosure. In one embodiment, the engagement or attachment 142 is performed by an operator 134. In one embodiment, the printer cartridge component comprises any or all of a replacement OPC drum 146, a remanufactured assembled OPC drum 148, and/or a remanufactured drum gear assembly 150.

FIGS. 13A-13B show views of an embodiment of a device 80, such as in the form of horizontal tool 80a, vertical tool 80b, or vertical tool 80c, used in disassembling a drum gear assembly in one of the embodiments of a method of the disclosure.

FIGS. 14A-14E show views of another embodiment of a device 80, such as in the form of horizontal tool 80a, vertical tool 80b, or vertical tool 80c, used in assembling or disassembling a drum gear assembly in one of the embodiments of a method of the disclosure.

Figure 10:
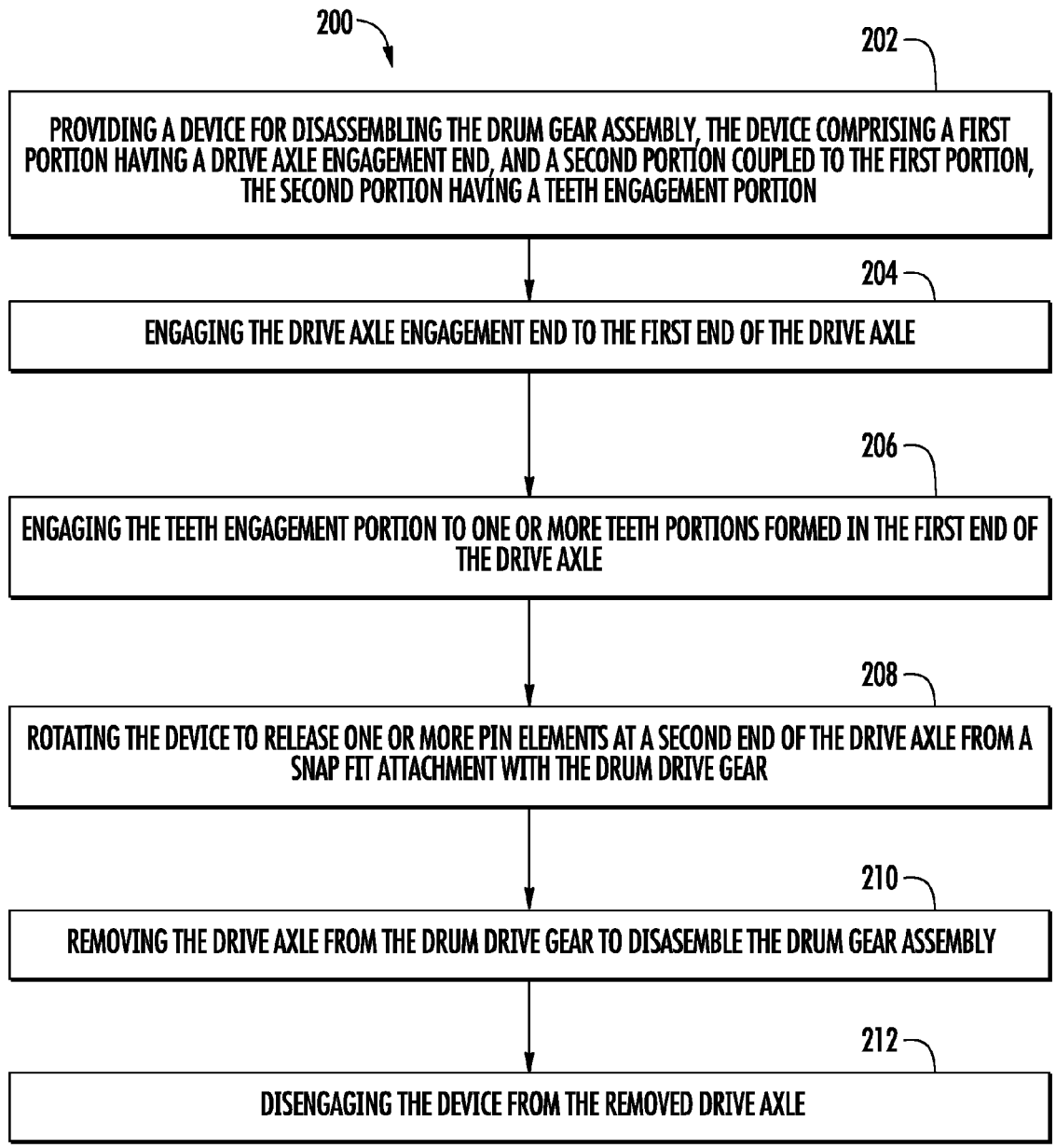
FIG. 10 is a flow diagram of an embodiment of a method for remanufacturing a printer cartridge component of the disclosure.
Figure 11:
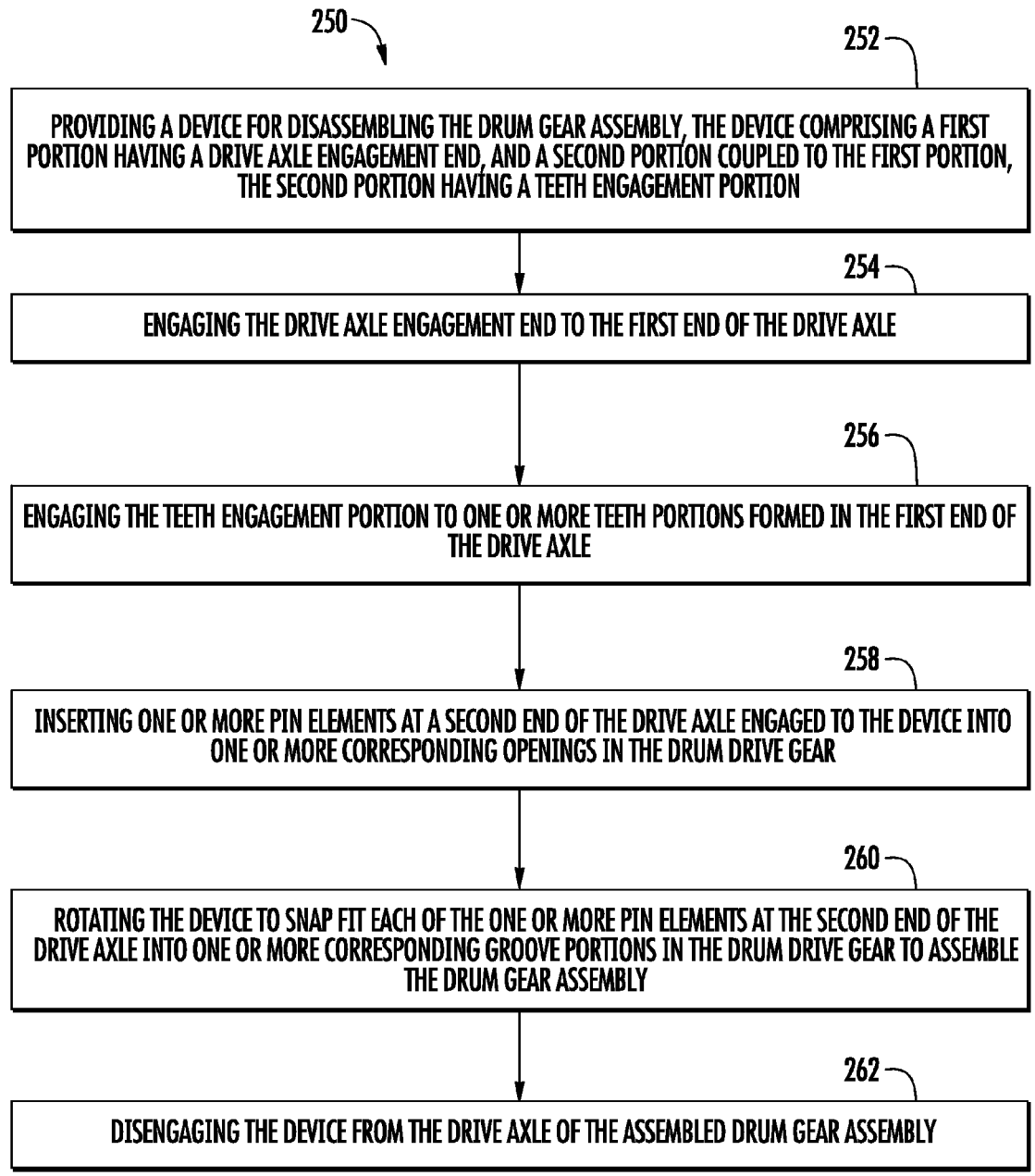
FIG. 11 is a flow diagram of an embodiment of a method for remanufacturing a printer cartridge component of the disclosure.

Another embodiment of the invention is a method 200 for remanufacturing a printer cartridge component 36. FIG. 10 is a flow diagram of an embodiment of the method 200 for remanufacturing the printer cartridge component 36 (see FIG. 1B) of the disclosure. Preferably, the printer cartridge component 36 (see FIG. 1B) is a drum gear assembly 36a (see FIG. 1B) configured for attachment to an OPC drum 28 (see FIGS. 1A, 1C) configured for use in a printer cartridge 10 (see FIG. 1A). The drum gear assembly 36a (see FIG. 1B) has a drum drive gear 38 (see FIGS. 1B, 2A) and a drive axle 40 (see FIGS. 1B, 2B) configured for attachment to the drum drive gear 38 (see FIGS. 1B, 2A). As shown in FIG. 2B the drive axle 40 has a first end 42, such as in the form of tool engagement end 42a. The first end 42 has teeth portions 44 with cut-out portions 46 between the teeth portions 44. Each tooth portion 44 has sides 47a and 47b.

The drive axle 40 (see FIG. 2B) further has a recess 48 at a central portion 50 of the first end 42. The recess 48 is surrounded by the teeth portions 44 and the cut-out portions 46.

As shown in FIG. 10, the method 200 comprises the step 202 of providing a device 80 (see FIGS. 3A, 4A, 5A, 12A) for disassembling the drum gear assembly 36a (see FIG. 1B). The device 80 (see FIGS. 3A, 4A, 5A, 12A) comprises a first portion having a drive axle engagement end. The device further comprises a second portion coupled to the first portion. The second portion has a teeth engagement portion. The method 200 further comprises the step 204 of engaging the drive axle engagement end to the first end of the drive axle. The method 200 further comprises the step 206 of engaging the teeth engagement portion to one or more of the teeth portions formed in the first end of the drive axle. The method 200 further comprises the step 208 of rotating the device 80 (see FIGS. 3A, 4A, 5A, 12A) to release one or more pin elements at a bottom portion of the drive axle from a snap fit attachment with the drum drive gear. The method 200 further comprises the step 210 of removing the drive axle from the drum drive gear to disassemble the drum gear assembly. The method 200 further comprises the step 212 of disengaging the device 80 (see FIGS. 3A, 4A, 5A, 12A) from the removed drive axle.

The method 200 may further comprise the steps of providing a replacement drum drive gear coupled to a replacement OPC drum configured for use in the printer cartridge. The method 200 may further comprise the step of assembling the removed drive axle to the replacement drum drive gear with the device 80 (see FIGS. 3A, 4A, 5A, 12A). The assembling may comprise engaging the drive axle engagement end to the first end of the drive axle. The assembling may further comprise engaging the teeth engagement portion to one or more of the teeth portions formed in the first end of the drive axle. The assembling may further comprise inserting the one or more pin elements at the second end of the drive axle into one or more corresponding openings in the replacement drum drive gear. The assembling may further comprise rotating the device 80 (see FIGS. 3A, 4A, 5A, 12A) to snap fit each of the one or more pin elements into one or more corresponding groove portions in the replacement drum drive gear to assemble a remanufactured drum gear assembly. The assembling may further comprise disengaging the device 80 (see FIGS. 3A, 4A, 5A, 12A) from the drive axle of the assembled remanufactured drum gear assembly.

The step 204 of engaging the drive axle engagement end 83 to the first end of the drive axle may further comprise engaging the drive axle engagement end comprising a U-shaped fork portion 92 to the neck portion 52 of the first end 42 of the drive axle 40. The step 204 of engaging the drive axle engagement end 83 to the first end 42 of the drive axle 40 further comprises engaging the drive axle engagement end 83 comprising a rounded tip portion 98 to a recessed portion 48 of the first end 42 of the drive axle 40.

The step 206 of engaging the teeth engagement portion 85 to one or more of the teeth portions 44 further comprises engaging the teeth engagement portion 85 comprising a center protrusion portion 100 to one or more of the teeth portions 44 formed in the first end 42 of the drive axle 40. The step 206 of engaging the teeth engagement portion 85 to one or more of the teeth portions 44 further comprises engaging the teeth engagement portion 85 comprising one or more projecting portions 110 to one or more of the teeth portions 44 formed in the first end 42 of the drive axle 40. The OPC drum 28 does not necessarily have to be installed in the printer cartridge 10 when the drive axle 40 is disassembled. The drive axle 40 may be disassembled after the printer cartridge is completely disassembled and the OPC drum is removed. However, the method of disassembling the drive axle is preferably performed while the OPC drum is still in the printer cartridge. Preferably, the device 80 is used to assemble and disassemble the drum gear assembly 36a while the OPC drum is in the printer cartridge. The removed drive axle 40 may be reused with a replacement drum drive gear 144 and/or a replacement OPC drum 146.

Another embodiment of the invention is a method 250 for assembling a drum gear assembly 36a (see FIG. 1B) configured for attachment to an OPC drum 28 (see FIG. 1C) configured for installation in a printer cartridge 10 (see FIG. 1A). The drum gear assembly has a drum drive gear and a drive axle configured for attachment to the drum drive gear. The drive axle has a first end with teeth portions. The method 250 comprises the step 252 of providing a device 80 (see FIGS. 3A, 4A, 5A, 12A) for assembling the drum gear assembly. The device 80 (see FIGS. 3A, 4A, 5A, 12A) comprises a first portion having a drive axle engagement end. The device comprises a second portion coupled to the first portion. The second portion has a teeth engagement portion. The method 250 further comprises the step 254 of engaging the drive axle engagement end to the first end of the drive axle. The method 250 further comprises the step 256 of engaging the teeth engagement portion to one or more of the teeth portions formed in the first end of the drive axle. The method 250 further comprises the step 258 of inserting one or more pin elements at a bottom portion of the drive axle engaged to the device into one or more corresponding openings in the drum drive gear. The method 250 further comprises the step 260 of rotating the device to snap fit each of the one or more pin elements at the bottom portion of the drive axle into one or more corresponding groove portions in the drum drive gear to assemble the drum gear assembly. The method 250 further comprises the step 262 of disengaging the device 80 (see FIGS. 3A, 4A, 5A, 12A) from the drive axle of the assembled drum gear assembly. The drum drive gear 38 of the assembled drum gear assembly may be attached to a replacement OPC drum installed in the printer cartridge 10 (see FIG. 1A). The method 250 may further comprise coupling the assembled drum gear assembly to a replacement OPC drum to obtain a remanufactured assembled OPC drum. The method 250 may further comprise installing the remanufactured assembled OPC drum into a printer cartridge 10 (see FIG. 1A), such as a laser printer cartridge, including a toner cartridge. The step 254 of engaging the drive axle engagement end to the first end of the drive axle may further comprise engaging the drive axle engagement end comprising a U-shaped fork portion to a neck portion of the first end of the drive axle. The step 254 of engaging the drive axle engagement end to the first end of the drive axle may further comprise engaging the drive axle engagement end comprising a rounded tip portion to a recessed portion of the first end of the drive axle. The step 256 of engaging the teeth engagement portion to one or more of the teeth portions further comprises engaging the teeth engagement portion comprising a center protrusion portion to one or more of the teeth portions formed in the first end of the drive axle. The step 256 of engaging the teeth engagement portion to one or more of the teeth portions further comprises engaging the teeth engagement portion comprising one or more projecting portions to one or more of the teeth portions formed in the first end of the drive axle.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and for purposes of limitation. The invention is not limited in its application to the details of the construction and to the arrangement of the components set forth in the above description or as illustrated in the drawings.

What is claimed is:

1. A device for remanufacturing a printer cartridge component, the printer cartridge component being a drum gear assembly configured for attachment to an organic photoconductor drum configured for use in a printer cartridge, the drum gear assembly having a drum drive gear and a drive axle attached to the drum drive gear, the drive axle having a first end with teeth portions, the device comprising:
   a first portion having a drive axle engagement end configured to engage the drive axle; and,
   a second portion coupled to the first portion, the second portion having a teeth engagement portion to engage one or more of the teeth portions of the drive axle,
   wherein the first portion and the second portion are configured to assemble and disassemble the drum gear assembly.

2. The device of claim 1 wherein the drive axle engagement end comprises a U-shaped fork portion configured to engage the first end of the drive axle.

3. The device of claim 1 wherein the drive axle engagement end comprises a rounded tip portion configured to engage the first end of the drive axle.

4. The device of claim 1 wherein the teeth engagement portion comprises a center protrusion portion configured to engage one or more teeth portions formed in the first end of the drive axle.

5. The device of claim 1 wherein the teeth engagement portion comprises one or more projecting portions configured to engage one or more teeth portions formed in the first end of the drive axle.

6. The device of claim 5 wherein the teeth engagement portion comprises two projecting portions.

7. The device of claim 5 wherein the teeth engagement portion comprises four projecting portions.

8. The device of claim 5 wherein the one or more projecting portions comprise one or more fins having sloped sides.

9. The device of claim 1 wherein the first portion and the second portion are configured to remove the drive axle from the drum drive gear and are configured to attach the drive axle to the drum drive gear.

10. The device of claim 1 wherein the device is comprised of a material selected from the group consisting of one or more of stainless steel, copper aluminum, brass, acrylic, resilient plastic, wood, bamboo, and a mixture thereof.

11. The device of claim 1 wherein the device comprises a manual tool for remanufacturing a printer cartridge.

12. A method for remanufacturing a printer cartridge component, the printer cartridge component being a drum gear assembly configured for attachment to an organic photoconductor drum configured for use in a printer cartridge, the drum gear assembly having a drum drive gear and a drive axle attached to the drum drive gear, the drive axle having a first end with teeth portions, with a device comprising a first portion having a drive axle engagement end and a second portion coupled to the first portion, the second portion having a teeth engagement portion, the method comprising the steps of:
   engaging the drive axle engagement end to the first end of the drive axle;
   engaging the teeth engagement portion to one or more of the teeth portions formed in the first end of the drive axle;
   rotating the device to release one or more pin elements at a second end of the drive axle from a snap fit attachment with the drum drive gear;
   removing the drive axle from the drum drive gear to disassemble the drum gear assembly; and,
   disengaging the device from the removed drive axle.

13. The method of claim 12 wherein the step of engaging the drive axle engagement end to the first end of the drive axle further comprises engaging the drive axle engagement end comprising a U-shaped fork portion to a neck portion of the first end of the drive axle.

14. The method of claim 12 wherein the step of engaging the drive axle engagement end to the first end of the drive axle further comprises engaging the drive axle engagement end comprising a rounded tip portion to a recessed portion of the first end of the drive axle.

15. The method of claim 14 further comprising the steps of:
   assembling the removed drive axle to a replacement drum drive gear with the device, the assembling comprising:
      engaging the drive axle engagement end to the first end of the drive axle;
      engaging the teeth engagement portion to one or more of the teeth portions formed in the first end of the drive axle;
      inserting the one or more pin elements at the second end of the drive axle into one or more corresponding openings in the replacement drum drive gear;
      rotating the device to snap fit each of the one or more pin elements into one or more corresponding groove portions in the replacement drum drive gear to assemble a remanufactured drum gear assembly; and,
      disengaging the device from the drive axle of the assembled remanufactured drum gear assembly.

16. The method of claim 15 wherein the replacement drum drive gear is coupled to a replacement organic photoconductor drum configured for use in the printer cartridge.

17. The method of claim 12 wherein the step of engaging the teeth engagement portion to one or more of the teeth portions further comprises engaging the teeth engagement portion comprising a center protrusion portion to one or more of the teeth portions formed in the first end of the drive axle.

18. The method of claim 12 wherein the step of engaging the teeth engagement portion to one or more of the teeth portions further comprises engaging the teeth engagement portion comprising one or more projecting portions to one or more of the teeth portions formed in the first end of the drive axle.

19. A method for assembling a drum gear assembly configured for attachment to an organic photoconductor drum configured for installation in a printer cartridge, the drum gear assembly having a drum drive gear and a drive axle configured for attachment to the drum drive gear, the drive axle having a first end with teeth portions, with a device comprising a first portion having a drive axle engagement end and a second portion coupled to the first portion, the second portion having a teeth engagement portion, the method comprising the steps of:
   engaging the drive axle engagement end to the first end of the drive axle;
   engaging the teeth engagement portion to one or more of the teeth portions formed in the first end of the drive axle;
   inserting one or more pin elements at a second end of the drive axle engaged to the device into one or more corresponding openings in the drum drive gear;
   rotating the device to snap fit each of the one or more pin elements at the second end of the drive axle into one or more corresponding groove portions in the drum drive gear to assemble the drum gear assembly; and, disengaging the device from the drive axle of the assembled drum gear assembly.

20. The method of claim 19 wherein the drum drive gear of the assembled drum gear assembly is attached to a replacement organic photoconductor drum installed in the printer cartridge.

21. The method of claim 19 further comprising coupling the assembled drum gear assembly to a replacement organic photoconductor drum to obtain a remanufactured assembled organic photoconductor drum.

22. The method of claim 21 further comprising installing the remanufactured assembled organic photoconductor drum into a printer cartridge.

23. The method of claim 19 wherein the step of engaging the drive axle engagement end to the first end of the drive axle further comprises engaging the drive axle engagement end comprising a U-shaped fork portion to a neck portion of the first end of the drive axle.

24. The method of claim 19 wherein the step of engaging the drive axle engagement end to the first end of the drive axle further comprises engaging the drive axle engagement end comprising a rounded tip portion to a recessed portion of the first end of the drive axle.

25. The method of claim 19 wherein the step of engaging the teeth engagement portion to one or more of the teeth portions further comprises engaging the teeth engagement portion comprising a center protrusion portion to one or more of the teeth portions formed in the first end of the drive axle.

26. The method of claim 19 wherein the step of engaging the teeth engagement portion to one or more of the teeth portions further comprises engaging the teeth engagement portion comprising one or more projecting portions to one or more of the teeth portions formed in the first end of the drive axle.

* * * * *